(12) United States Patent
Awazu et al.

(10) Patent No.: US 11,272,107 B2
(45) Date of Patent: Mar. 8, 2022

(54) IMAGING DEVICE AND VIBRATION SUPPRESSION METHOD FOR IMAGING DEVICE

(71) Applicant: FUJIFILM Corporation, Tokyo (JP)

(72) Inventors: Kouhei Awazu, Saitama (JP); Yuta Abe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/157,788

(22) Filed: Jan. 25, 2021

(65) Prior Publication Data

US 2021/0152720 A1    May 20, 2021

Related U.S. Application Data

(63) Continuation of application No. PCT/JP2019/025645, filed on Jun. 27, 2019.

(30) Foreign Application Priority Data

Jul. 27, 2018 (JP) .............................. JP2018-141623
Mar. 26, 2019 (JP) .............................. JP2019-058923

(51) Int. Cl.
*H04N 5/232* (2006.01)
*G03B 9/36* (2021.01)
*H04N 5/225* (2006.01)

(52) U.S. Cl.
CPC ............. *H04N 5/2328* (2013.01); *G03B 9/36* (2013.01); *H04N 5/2254* (2013.01)

(58) Field of Classification Search
None
See application file for complete search history.

(56) References Cited

U.S. PATENT DOCUMENTS 5,708,892 A * 1/1998 Kon .................. G03B 9/18
                                                   396/452
2008/0211922 A1   9/2008 Murashima et al.
(Continued)

FOREIGN PATENT DOCUMENTS

CN        101414094 A     4/2009
CN        103890629 A     6/2014
(Continued)

OTHER PUBLICATIONS

An Office Action mailed by China National Intellectual Property Administration dated Sep. 15, 2021, which corresponds to Chinese Patent Application No. 201980049807.5 and is related to U.S. Appl. No. 17/157,788; with English language translation.
(Continued)

*Primary Examiner* — William B Perkey
(74) *Attorney, Agent, or Firm* — Studebaker & Brackett PC

(57) ABSTRACT

An imaging device includes: an imager that is provided in a device body; a shutter that is provided in the device body, includes a support member and a shutter member; an actuator that is provided in the device body and moves the imager in a direction orthogonal to an optical axis to correct an amount of camera shake; and a plurality of elastic members that are disposed on at least one side and the other side of an imaginary straight line passing through a center of gravity of the shutter and orthogonal to the optical axis in a case where the plurality of elastic members are viewed in a direction of the optical axis and are in contact with the device body and the support member.

19 Claims, 28 Drawing Sheets

(56) References Cited

U.S. PATENT DOCUMENTS

| | | | |
|---|---|---|---|
| 2009/0097833 A1 | 4/2009 | Imada | |
| 2013/0194442 A1* | 8/2013 | Yazawa | H04N 5/23258 |
| | | | 348/208.7 |
| 2014/0091204 A1 | 4/2014 | Ezawa et al. | |
| 2015/0110481 A1 | 4/2015 | Suzuka | |
| 2016/0139492 A1 | 5/2016 | Kamada | |
| 2020/0249426 A1* | 8/2020 | Kazuo | H04N 5/2253 |

FOREIGN PATENT DOCUMENTS

| | | |
|---|---|---|
| JP | S54-107334 A | 8/1979 |
| JP | H06-067259 A | 3/1994 |
| JP | H09-244099 A | 9/1997 |
| JP | 2002-139759 A | 5/2002 |
| JP | 2005-277628 A | 10/2005 |
| JP | 2007-221215 A | 8/2007 |
| JP | 2011-107439 A | 6/2011 |
| JP | 2016-099427 A | 5/2016 |

OTHER PUBLICATIONS

International Search Report issued in PCT/JP2019/025645; dated Sep. 10, 2019.
Written Opinion issued in PCT/JP2019/025645; dated Sep. 10, 2019.
International Preliminary Report On Patentability issued in PCT/JP2019/025645; completed Jun. 15, 2020.

\* cited by examiner

IMAGING DEVICE AND VIBRATION SUPPRESSION METHOD FOR IMAGING DEVICE

CROSS-REFERENCE TO RELATED APPLICATIONS

This application is a continuation application of International Application No. PCT/JP2019/025645, filed Jun. 27, 2019, the disclosure of which is incorporated herein by reference in its entirety. Further, this application claims priority under 35 USC 119 from Japanese Patent Application No. 2018-141623 filed Jul. 27, 2018, and Japanese Patent Application No. 2019-058923 filed Mar. 26, 2019, the disclosures of which are incorporated herein by reference in their entireties.

BACKGROUND

1. Technical Field

The present disclosure relates to an imaging device and a vibration suppression method for the imaging device.

2. Related Art

A shake correction camera disclosed in JP2011-107439A comprises an imaging optical system, an imager, a shake correction unit, an imaging controller, an imaging body part that includes a shutter button and a shutter spring, a frame that supports the imaging body part so as to allow the imaging body part to move rotationally, and a support spring that is held by the frame and supports the imaging body part.

SUMMARY

There is an imaging device that includes a shutter of which a shutter member moves and a camera shake correction unit of which an imager moves. There is a possibility that erroneous correction, such as a reduction in the resolution of the imager, may occur in the imaging device since an impact force generated in a case where the shutter member moves is transmitted to the camera shake correction unit. Particularly, since a portion of the imaging body part close to a rotational movement axis is not supported by the support spring in the same configuration as that disclosed in JP2011-107439A, an impact force generated in a case where the shutter member moves is transmitted to the camera shake correction unit just as it is through the portion of the imaging body part close to the rotational movement axis. For this reason, there is a possibility that erroneous correction may occur in the camera shake correction unit.

That is, there is room for improvement in order to suppress the occurrence of erroneous correction in the camera shake correction unit in a case where the shutter member moves in the configuration that includes the shutter of which the shutter member moves and the camera shake correction unit of which the imager moves.

A technique of the disclosure provides an imaging device and a vibration suppression method for the imaging device that can suppress the occurrence of erroneous correction in a camera shake correction unit in a case where a shutter member moves in configuration including a shutter of which the shutter member moves and the camera shake correction unit of which an imager moves.

According to a first aspect of the technique of the disclosure, there is provided an imaging device comprising: an imager that is provided in a device body and includes an imaging surface orthogonal to an optical axis of light forming an optical image; a shutter that is provided in the device body, includes a support member and a shutter member supported by the support member and moving in a direction orthogonal to the optical axis, and adjusts an amount of light to be incident on the imager; a camera shake correction unit that is provided in the device body and moves the imager in the direction orthogonal to the optical axis to correct an amount of camera shake; and a plurality of elastic members that are disposed on at least one side and the other side of an imaginary straight line passing through a center of gravity of the shutter and orthogonal to the optical axis in a case where the plurality of elastic members are viewed in a direction of the optical axis and are in contact with the device body and the support member.

According to a second aspect of the technique of the disclosure, in the imaging device according to the first aspect, two elastic members of the plurality of elastic members are disposed at intervals on the imaginary straight line.

According to a third aspect of the technique of the disclosure, in the imaging device according to the first or second aspect, the plurality of elastic members are aligned with the support member in a movement direction of the shutter member.

According to a fourth aspect of the technique of the disclosure, in the imaging device according to any one of the first to third aspects, among loads that are caused to act on the support member by the plurality of elastic members, the loads of which distances from the imaginary straight line are longer are smaller than the loads of which distances from the imaginary straight line are shorter.

According to a fifth aspect of the technique of the disclosure, in the imaging device according to any one of the first to fourth aspects, the imaginary straight line extends along a movement direction of the shutter member, and the plurality of elastic members include a plurality of first elastic members that are disposed on the one side at intervals in the movement direction and a plurality of second elastic members that are disposed on the other side at intervals in the movement direction. Further, in a case where the elastic members are viewed in the direction of the optical axis, a distance between the imaginary straight line and the first elastic member in an orthogonal direction orthogonal to the movement direction is denoted by L1, a load caused to act on the support member in the movement direction by the first elastic member is denoted by F1, a distance between the imaginary straight line and the second elastic member in the orthogonal direction is denoted by L2, and a load caused to act on the support member in the movement direction by the second elastic member is denoted by F2, F1×L1=F2×L2 is satisfied.

According to a sixth aspect of the technique of the disclosure, in the imaging device according to the fifth aspect, the imaginary straight line includes a first imaginary straight line extending in the movement direction and a second imaginary straight line extending in the orthogonal direction in a case where the imaginary straight line is viewed in the direction of the optical axis, and the imaging device includes a plurality of auxiliary elastic members that include a third elastic member disposed on one side of the second imaginary straight line in the movement direction and a fourth elastic member disposed on the other side of the second imaginary straight line in the movement direction and are in contact with the device body and the support member. Further, in a case where a distance between the second imaginary straight line and the third elastic member in the movement direction is denoted by LA, a load caused to act on the support member in the orthogonal direction by the third elastic member is denoted by FA, a distance between the second imaginary straight line and the fourth elastic member in the movement direction is denoted by LB, and a load caused to act on the support member in the orthogonal direction by the fourth elastic member is denoted by FB, FA×LA=FB×LB is satisfied.

According to a seventh aspect of the technique of the disclosure, in the imaging device according to any one of the first to sixth aspects, a plurality of damping members damping vibration of the shutter are sandwiched between the device body and the support member.

According to an eighth aspect of the technique of the disclosure, in the imaging device according to the seventh aspect, the support member is formed in a polygonal shape in a case where the support member is viewed in the direction of the optical axis.

According to a ninth aspect of the technique of the disclosure, in the imaging device according to the eighth aspect, the plurality of damping members are in contact with two side surfaces forming each corner of the support member in directions different from each other in a case where the plurality of damping members are viewed in the direction of the optical axis.

According to a tenth aspect of the technique of the disclosure, in the imaging device according to any one of the seventh to ninth aspects, the plurality of damping members include friction members that damp vibration of the support member by friction forces.

According to an eleventh aspect of the technique of the disclosure, in the imaging device according to any one of the first to tenth aspects, the support member is housed in the device body.

According to a twelfth aspect of the technique of the disclosure, in the imaging device according to the first aspect, the plurality of elastic members are in contact with a set of corners which are opposite corners of the support member in a case where the plurality of elastic members are viewed in the direction of the optical axis.

According to a thirteenth aspect of the technique of the disclosure, in the imaging device according to the twelfth aspect, the plurality of elastic members are in contact with two side surfaces forming each of the corners in directions different from each other in a case where the plurality of elastic members are viewed in the direction of the optical axis.

According to a fourteenth aspect of the technique of the disclosure, in the imaging device according to the twelfth or thirteenth aspect, an impact absorbing member, which absorbs impact acting on the shutter, is disposed in a rotation region of the corner about a center of gravity of the shutter and is sandwiched between the device body and the support member.

According to a fifteenth aspect of the technique of the disclosure, in the imaging device according to any one of the twelfth to fourteenth aspects, a sliding member is sandwiched between the device body and the support member in the direction of the optical axis.

According to a sixteenth aspect of the technique of the disclosure, in the imaging device according to any one of the twelfth to fifteenth aspects, a through-hole penetrating the support member in the direction of the optical axis is formed in the support member, a fastening target portion is formed on the device body, and the imaging device includes a fastening member including a shaft portion that is inserted into the through-hole and fastened to the fastening target portion and an overhanging portion that overhangs from an end portion of the shaft portion close to the support member in a direction crossing an axial direction.

According to a seventeenth aspect of the technique of the disclosure, in the imaging device according to the sixteenth aspect, a portion of an outer peripheral surface of the shaft portion facing a hole wall of the through-hole is provided with a contact member that has elasticity and is capable of coming into contact with the hole wall.

According to an eighteenth aspect of the technique of the disclosure, there is provided a vibration suppression method for an imaging device including an imager that includes an imaging surface orthogonal to an optical axis of light forming an optical image, a shutter that is provided in a device body, includes a support member and a shutter member supported by the support member and moving in a direction orthogonal to the optical axis, and adjusts an amount of light to be incident on the imager, and a camera shake correction unit that moves the imager in the direction orthogonal to the optical axis to correct an amount of camera shake. The vibration suppression method comprises: disposing elastic members on at least one side and the other side of an imaginary straight line passing through a center of gravity of the shutter and orthogonal to the optical axis in a case where the elastic members are viewed in a direction of the optical axis; and supporting the support member by the device body through the elastic members to suppress vibration of the shutter.

According to the technique of the disclosure, it is possible to suppress the occurrence of erroneous correction in a camera shake correction unit in a case where a shutter member moves in configuration including a shutter of which the shutter member moves and the camera shake correction unit of which an imager moves.

BRIEF DESCRIPTION OF THE DRAWINGS

Exemplary embodiments of the present invention will be described in detail based on the following figures, wherein.

DETAILED DESCRIPTION

Examples of an imaging device and a vibration suppression method for the imaging device according to a technique of the disclosure will be described below.

First Embodiment

Figure 1:
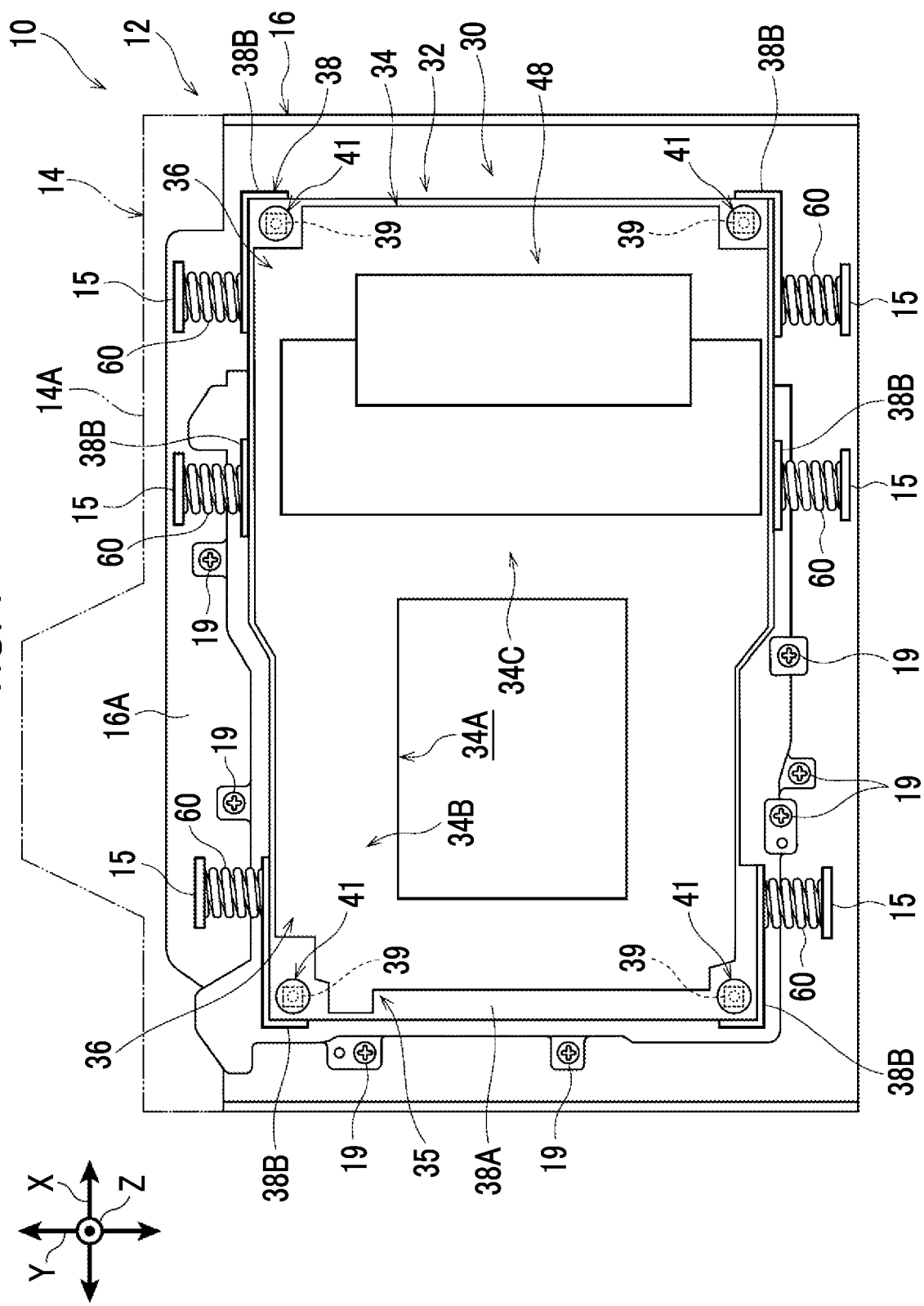
FIG. 1 is a diagram illustrating an example of a camera body and a shutter of a digital camera according to a first embodiment.

FIG. 1 shows a digital camera 10 as an example of an imaging device according to a first embodiment. The digital camera 10 includes a camera body 12, an imaging lens unit 17 (see FIG. 2), an imager 20 (see FIG. 2), a shutter 30, a correction unit 50 (see FIG. 2), and six coil springs 60 serving as an example of a plurality of elastic members.

<Camera Body>

The camera body 12 is an example of a device body. Further, the camera body 12 includes a cover member 14 that is formed in the shape of a hollow box and a base member 16 that is provided inside the cover member 14. The camera body 12 is provided with a liquid crystal display monitor and a plurality of buttons and dials (not shown). The outer shape of a main portion of the camera body 12 is a rectangular shape in a case where the camera body 12 is viewed in the direction of an optical axis of light from a subject (not shown). A part of the camera body 12 protrudes in the shape of a chevron.

In the following description, the longitudinal direction of the camera body 12 will be referred to as an X direction and the lateral direction of the camera body 12 will be referred to as a Y direction. In addition, the direction of the optical axis of light will be referred to as a Z direction. The X direction, the Y direction, and the Z direction are orthogonal to each other. Further, a state where the camera body 12 is disposed so that the X direction is along a horizontal direction is referred to as the horizontal attitude state of the digital camera 10. A state where the camera body 12 is disposed so that the X direction is along a vertical direction orthogonal to the horizontal direction is referred to as the vertical attitude state of the digital camera 10.

For example, the cover member 14 is divided into two pieces in the Z direction with a dividing line (not shown) as a boundary. Specifically, the cover member 14 includes a front cover member 14A that faces a subject (not shown) side in the Z direction and a rear cover member 14B (see FIG. 2) that faces the imager 20 side in the Z direction.

The base member 16 is made of, for example, sheet metal of which the thickness direction is parallel to the Z direction. Further, the base member 16 is fastened to the front cover member 14A using a plurality of screws 19 in a state where the base member 16 overlaps the back surface of the front cover member 14A. A through-hole (not shown) penetrating the base member 16 in the Z direction is formed in a part of the base member 16. The size of the through-hole is set to a size that does not affect the incidence of light from a subject.

For example, six standing plate portions 15 protruding toward the imager 20 side stand on a back surface 16A of the base member 16 facing the imager 20 (see FIG. 2) side in the Z direction. The six standing plate portions 15 are disposed at intervals in the X direction on the upper and lower sides of the base member 16 in the Y direction in a case where the six standing plate portions 15 are viewed in the Z direction. Further, the six standing plate portions 15 are disposed so that the thickness directions of the standing plate portions 15 are parallel to the Y direction. The outer shape of each of the six standing plate portions 15 is a quadrangular shape in a case where the six standing plate portions 15 are viewed in the Y direction.

Figure 2:
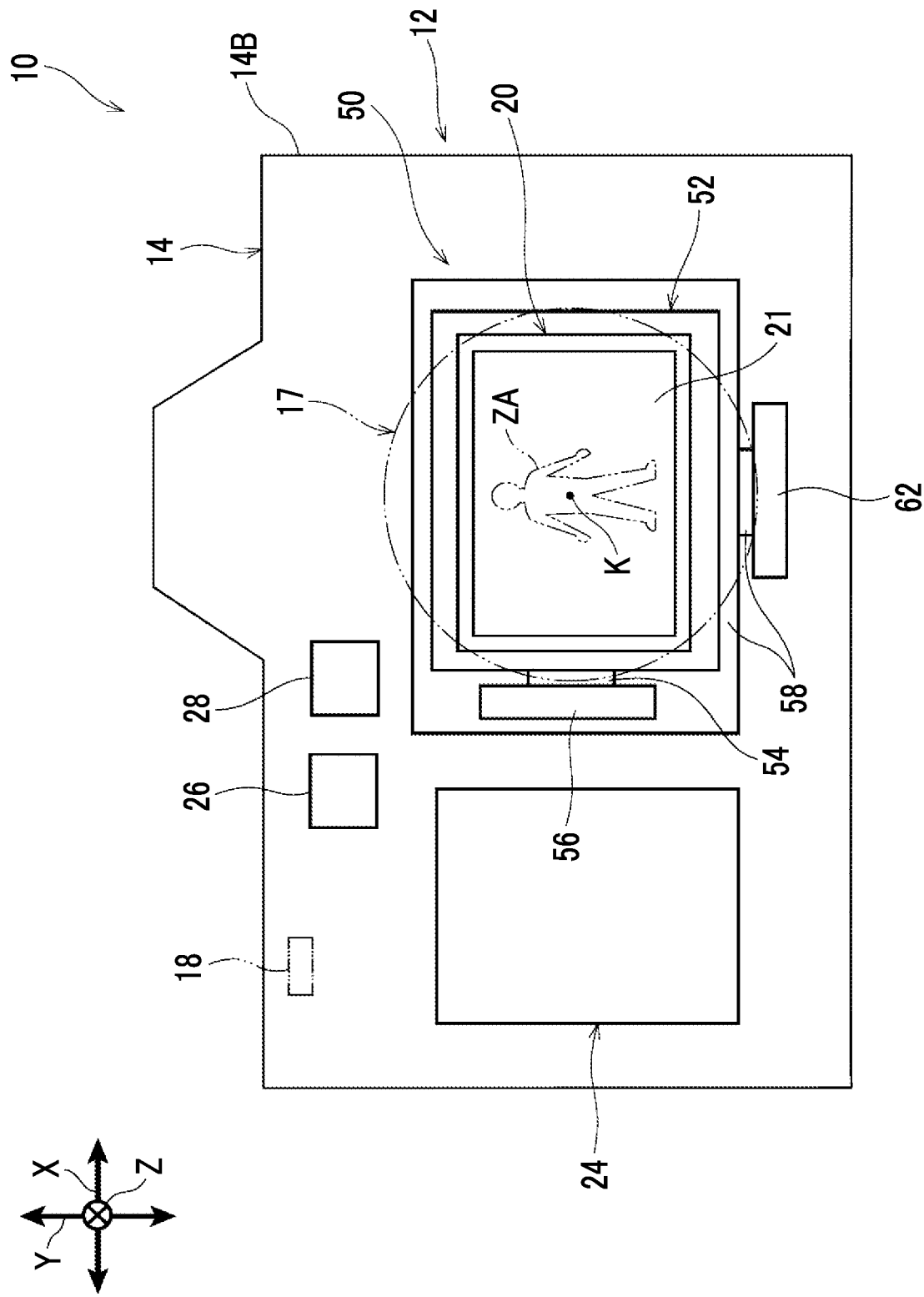
FIG. 2 is a diagram illustrating an example of the camera body, an imager, and the like of the digital camera according to the first embodiment.

FIG. 2 schematically shows a state where the inside of the digital camera 10 is viewed from the subject side in the Z direction. A shutter button 18 is provided on one side of the middle of the camera body 12 in the X direction and on the upper side of the middle thereof in the Y direction. Further, the imager 20 to be described later, a controller 24 controlling the operation of each part of the digital camera 10, an acceleration sensor 26, an angular velocity sensor 28, and a correction unit 50 are provided in the camera body 12. The controller 24 is an example of a computer, and includes a central processing unit (CPU), a storage unit, and a circuit board (not shown).

In a case where the shutter button 18 is pressed, the acceleration of the translational motion of the digital camera 10 in an X-Y plane is detected by the acceleration sensor 26. In a case where the shutter button 18 is pressed, the angular velocity of the rotational motion of the digital camera 10 is detected by the angular velocity sensor 28. Information about the acceleration and the angular velocity is sent to the controller 24.

<Imaging Lens Unit>

The imaging lens unit 17 shown in FIG. 2 is integrally assembled with the camera body 12. Further, the imaging lens unit 17 includes lenses (not shown), and forms an optical image ZA on the imager 20 to be described later. The optical image ZA is shown as, for example, a human figure.

<Imager>

The imager 20 is formed using, for example, a charge coupled device (CCD) image sensor. The imager 20 is not limited to a CCD image sensor, and may be formed of, for example, other image sensors, such as a complementary metal-oxide-semiconductor (CMOS) image sensor. Further, the imager 20 includes an image forming surface 21 on which incident light forms the optical image ZA. The image forming surface 21 is an example of an imaging surface. Furthermore, the image forming surface 21 is formed in, for example, a rectangular shape of which the longitudinal direction is parallel to the X direction and the lateral direction is parallel to the Y direction in a case where the image forming surface 21 is viewed in the Z direction.

In addition, the imager 20 is supported by the correction unit 50 to be described later in a state where the image forming surface 21 is disposed along the X-Y plane. In other words, the imager 20 is provided in the camera body 12. Further, the image forming surface 21 of the imager 20 is orthogonal (disposed orthogonal) to an optical axis K of light forming the optical image ZA.

<Shutter>

Figure 3:
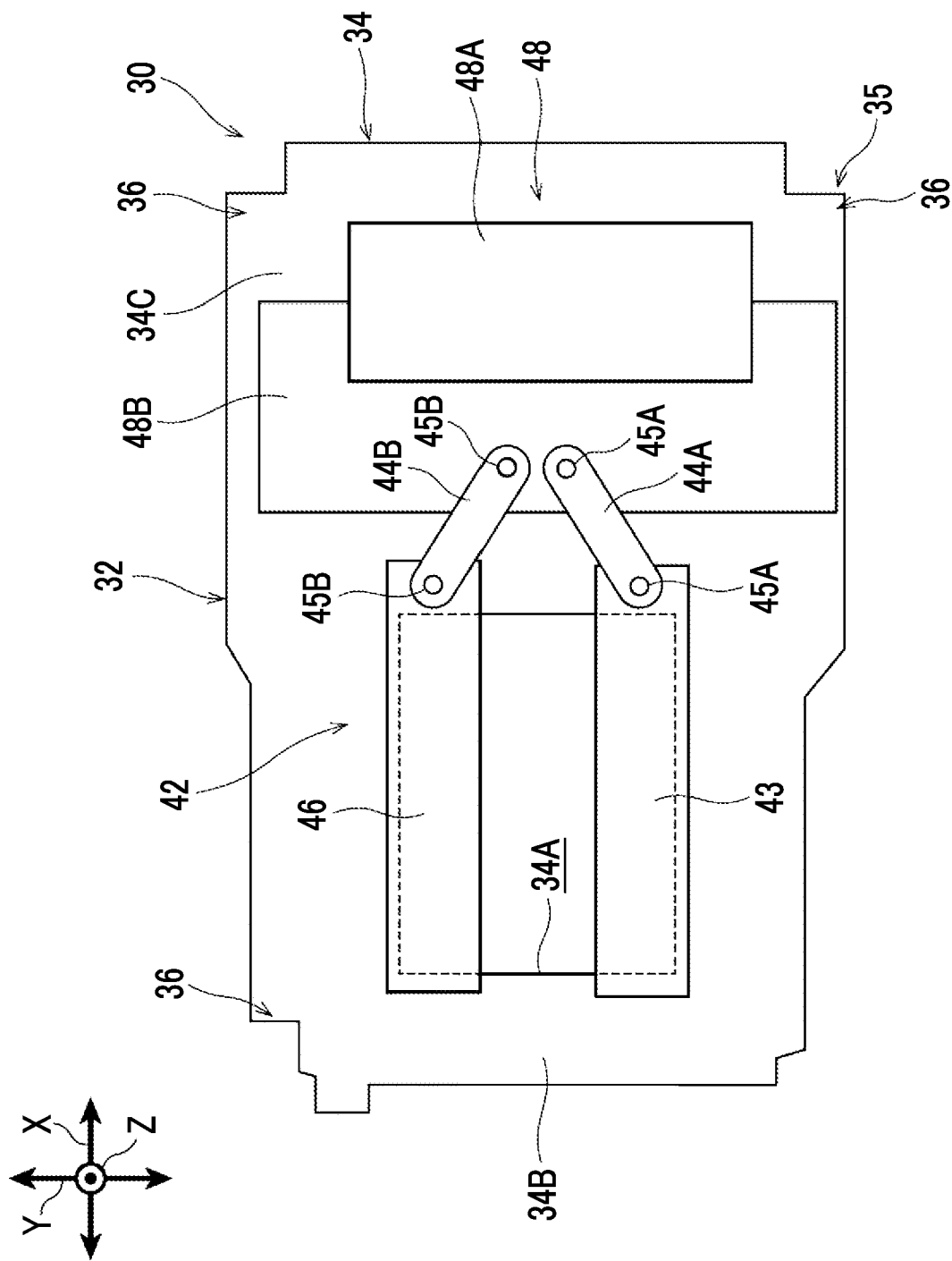
FIG. 3 is a diagram showing an example of the shutter according to the first embodiment.

The shutter 30 shown in FIG. 3 is provided in the camera body 12 (see FIG. 1). Specifically, the shutter 30 is formed of a focal-plane shutter. Further, the shutter 30 is disposed between the imaging lens unit 17 (see FIG. 2) and the imager 20 (see FIG. 2) in the Z direction, and has a function to adjust the amount of light to be incident on the imager 20. Furthermore, the shutter 30 includes a frame member 32 as an example of a support member and a shutter member 42.

<Frame Member>

The frame member 32 shown in FIG. 1 includes, for example, a body part 34 that forms a main portion of the frame member 32 and a bracket part 38 that is fixed to the body part 34. Further, the frame member 32 is housed in, for example, the camera body 12.

The body part 34 shown in FIG. 3 is formed in the shape of a box of which the thickness direction is parallel to the Z direction. In other words, the body part 34 spreads along the X-Y plane. Further, the body part 34 is formed in the shape of, for example, a polygon that includes a plurality of corners 35 including three right-angled corners 36 in a case where the body part 34 is viewed in the Z direction. Furthermore, in a case where the body part 34 is viewed in the Z direction, the body part 34 includes, for example, an opening portion 34A that penetrates the body part 34 in the Z direction, a peripheral edge portion 34B that surrounds the opening portion 34A, and a mounting target portion 34C on which a drive unit 48 to be described later is to be mounted. Guide portions (not shown) that guide a front curtain member 43 and a rear curtain member 46 to be described later in the Y direction are formed at the peripheral edge portion 34B. The camera body 12 and the bracket part 38 (see FIG. 1) are not shown in FIG. 3.

Figure 4:
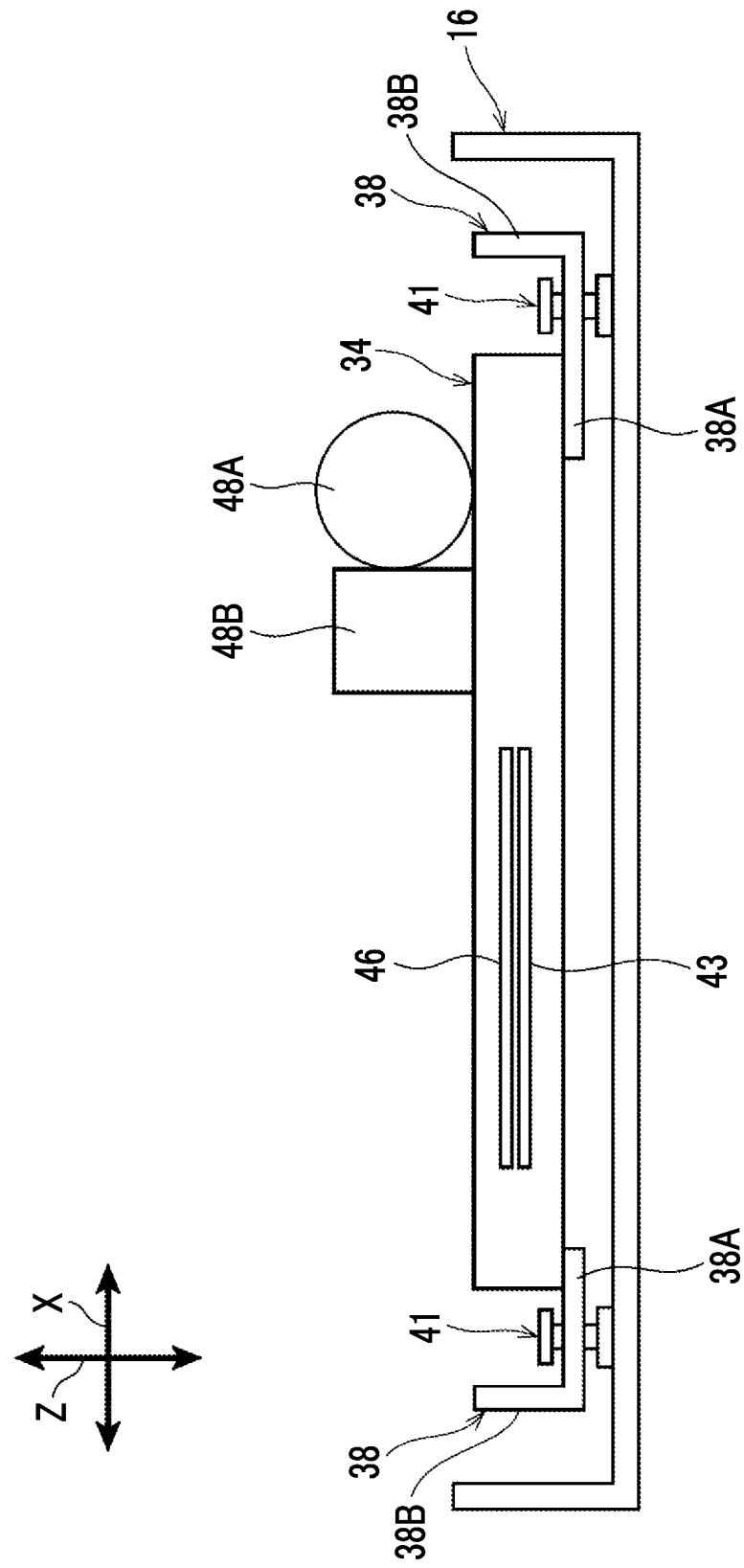
FIG. 4 is a diagram illustrating an example of a state where the camera body and the shutter according to the first embodiment are disposed in the direction of an optical axis.

The bracket part 38 shown in FIG. 4 includes, for example, a flat plate-like fixing portion 38A that is formed along the X-Y plane and a plurality of standing wall portions 38B that rise in the Z direction at the peripheral edges of the fixing portions 38A. In a state where the fixing portion 38A overlaps the body part 34 from the subject side in the Z direction, the fixing portion 38A is fixed to the body part 34 using screws (not shown). Further, four through-holes 39 (see FIG. 1) penetrating the fixing portion 38A in the Z direction are formed in the fixing portion 38A. The through-holes 39 are formed in, for example, a quadrangular shape in a case where the through-holes 39 are viewed in the Z direction.

In a case where the bracket part 38 shown in FIG. 1 is viewed in the Z direction, the bracket part 38 extends outward from the body part 34 in the X direction and the Y direction. The plurality of standing wall portions 38B are plate-like wall portions that extend in the Z direction so that the thickness direction of each standing wall portion is parallel to the X direction or the Y direction. Further, a part of the plurality of standing wall portions 38B are disposed so as to face the six standing plate portions 15 in the Y direction.

Figure 5:
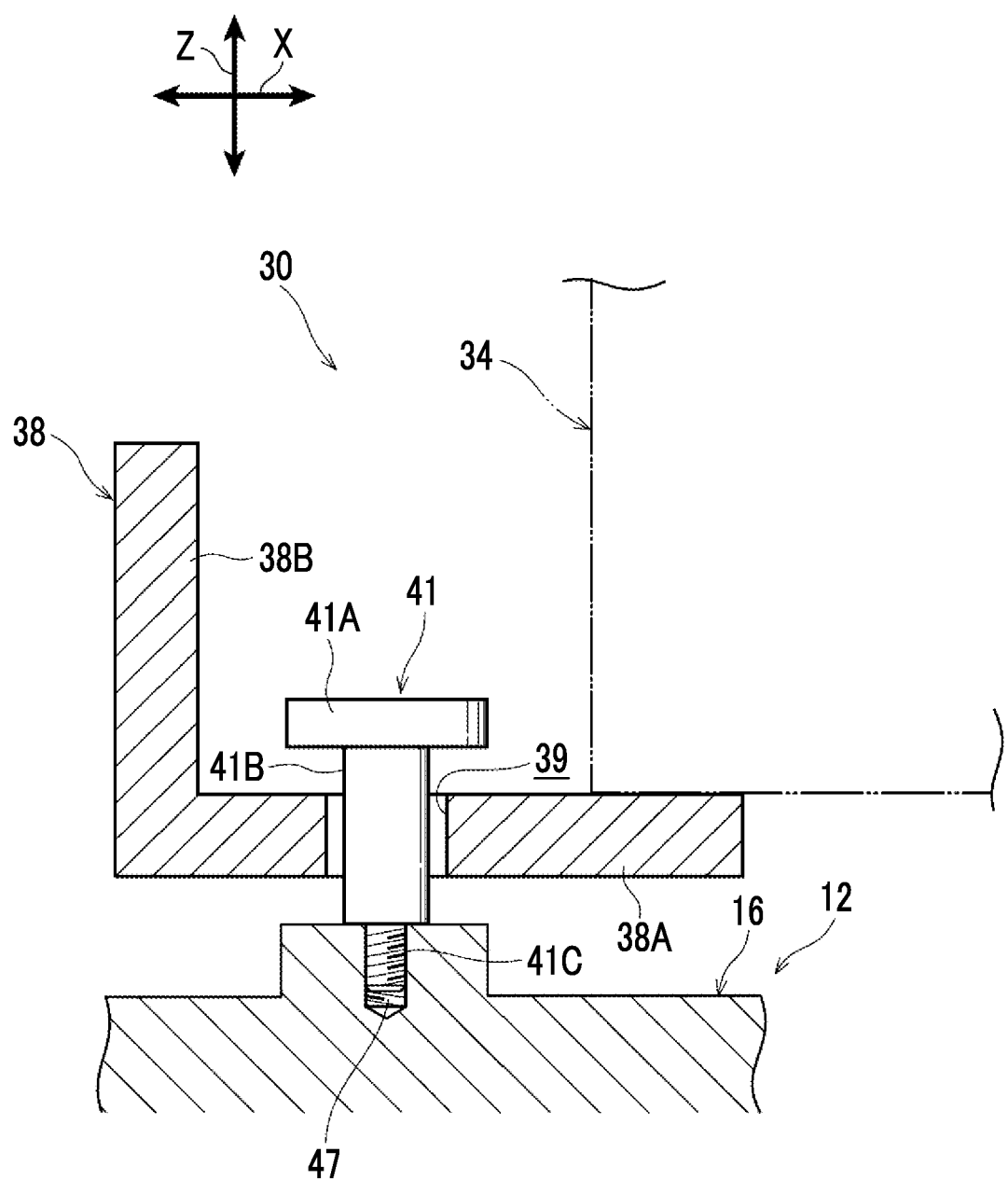
FIG. 5 is a cross-sectional view showing an example of a state where a screw member is fastened to the camera body according to the first embodiment.

A shaft portion 41B of a screw member 41 is inserted into each through-hole 39 shown in FIG. 5 in the Z direction. The screw member 41 includes, for example, a disc-shaped head portion 41A, a columnar shaft portion 41B that extends to one side from the center of the head portion 41A, and a male threaded portion 41C that is formed on the distal end side of the shaft portion 41B. A cross groove used to rotate the head portion 41A is not shown in each drawing. The size of the head portion 41A is set to a size that allows the head portion 41A to be in contact with the peripheral edge portion of the through-hole 39 in the Z direction. The thickness of the shaft portion 41B is set to a thickness that allows a gap to be formed between the shaft portion 41B and the peripheral edge portion of the through-hole 39 in the X direction and the Y direction (see FIG. 1) in a state where the shaft portion 41B is inserted into the through-hole 39 in the Z direction. The male threaded portion 41C is fastened to a female threaded portion 47 formed at the base member 16.

The screw members 41 restrict the excessive positional deviation of the shutter 30 with respect to the base member 16 (camera body 12) in the Z direction. On the other hand, the screw members 41 give a degree of freedom that allows the shutter 30 to be movable with respect to the camera body 12 in the X direction and the Y direction at portions where the through-holes 39 are formed. In addition, the screw members 41 have a function to restrict the excessive movement of the shutter 30 by coming into contact with the peripheral edge portions of the through-holes 39 in a case where the shutter 30 is moved more than necessary in the X direction and the Y direction.

<Shutter Member>

The shutter member 42 shown in FIG. 3 is supported by the frame member 32. Further, the shutter member 42 includes, for example, a front curtain member 43, a link member 44A, connecting pins 45A, a rear curtain member 46, a link member 44B, and connecting pins 45B. In this embodiment, a drive unit 48 driving the front curtain member 43 and the rear curtain member 46 is included in the shutter member 42.

The front curtain member 43 is formed of a curtain member of which the length in the X direction is equal to or longer than the length of the opening portion 34A in the X direction, and is disposed so that the thickness direction of the front curtain member 43 is parallel to the Z direction. One end portion of the link member 44A in a longitudinal direction is connected to one end portion of the front curtain member 43 in the X direction by the connecting pin 45A of which the axial direction is parallel to the Z direction. The other end portion of the link member 44A in the longitudinal direction is connected to the mounting target portion 34C by the other connecting pin 45A.

The rear curtain member 46 is formed of a curtain member of which the length in the X direction is equal to or longer than the length of the opening portion 34A in the X direction, and is disposed so that the thickness direction of the rear curtain member 46 is parallel to the Z direction. One end portion of the link member 44B in a longitudinal direction is connected to one end portion of the rear curtain member 46 in the X direction by the connecting pin 45B of which the axial direction is parallel to the Z direction. The other end portion of the link member 44B in the longitudinal direction is connected to the mounting target portion 34C by the other connecting pin 45B. The rear curtain member 46 is disposed above the front curtain member 43 in the Y direction. The front curtain member 43 and the rear curtain member 46 are guided by the already-described guide portions, so that the front curtain member 43 and the rear curtain member 46 are adapted to be movable in the Y direction. The Y direction is an example of a movement direction which is orthogonal to the optical axis K and in which the shutter member 42 is moved. The X direction is an example of an orthogonal direction that is orthogonal to the movement direction.

The drive unit 48 includes a motor 48A that is rotationally driven by the application of current from a power source unit (not shown) and a drive transmission unit 48B that includes a plurality of gears (not shown) transmitting the rotational drive of the motor 48A to the link members 44A and 44B. For example, the drive unit 48 is adapted to move the front curtain member 43 and the rear curtain member 46 upward in the Y direction and then to move the front curtain member 43 downward in the Y direction and to move the rear curtain member 46 downward in the Y direction in a case where the shutter button 18 (see FIG. 2) is pressed. A slit interval in the Y direction between the front curtain member 43 and the rear curtain member 46 to be moved in the Y direction is changed in the shutter 30, so that the exposure time of the digital camera 10 (see FIG. 1) is adjusted.

<Center of Gravity of Shutter>

Figure 6:
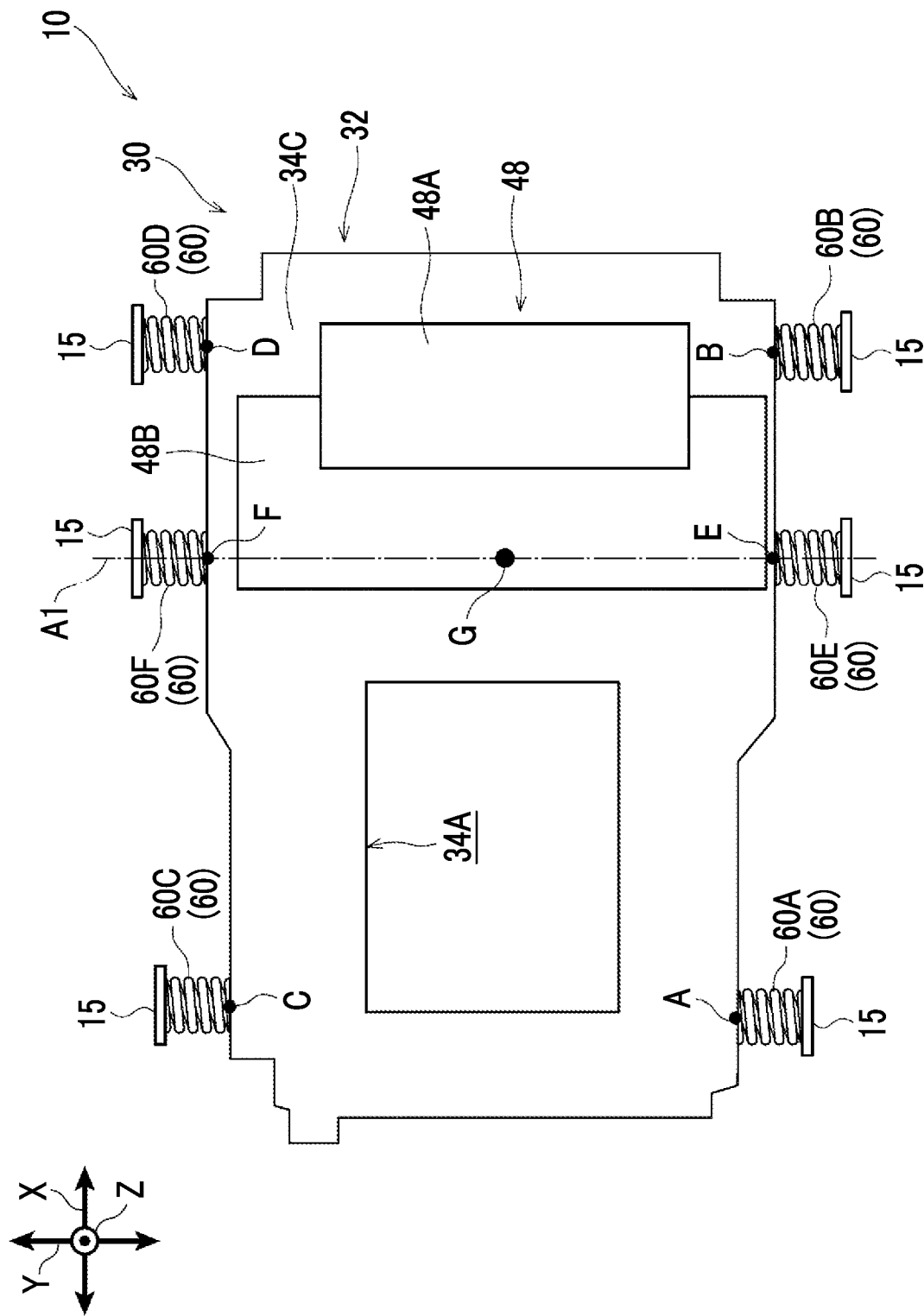
FIG. 6 is a diagram illustrating an example of a state where a plurality of coil springs according to the first embodiment are disposed.

The shutter 30 shown in FIG. 6 has a center G of gravity. The center G of gravity is a point of application of a resultant force of gravitational forces that act on the respective portions of the shutter 30. The center G of gravity is obtained as, for example, an intersection point between the line of action of the tension of a thread in a case where one point of the shutter 30 is suspended with the thread and is stopped and the line of action of the tension of a thread in a case where another point of the shutter 30 is suspended with the thread and is stopped. For example, the center G of gravity will be described in this embodiment as being positioned on the mounting target portion 34C in a case where the shutter 30 is viewed in the Z direction. A line, which passes through the center G of gravity and extends along the Y direction, is referred to as an imaginary straight line A1. The imaginary straight line A1 is orthogonal to the Z direction that is the direction of the optical axis. Further, the imaginary straight line A1 is orthogonal to the optical axis K in a case where the imaginary straight line A1 is viewed in the X direction.

<Correction Unit>

The correction unit 50 shown in FIG. 2 is an example of a camera shake correction unit, and is provided in the camera body 12. Further, the correction unit 50 moves the imager 20 in the X direction and the Y direction to correct the amount of camera shake of the digital camera 10. Specifically, the correction unit 50 includes a base plate 52, a Y-direction slider 54, a Y-direction actuator 56, an X-direction slider 58, and an X-direction actuator 62.

The base plate 52 is formed in the shape of a plate of which the thickness direction is parallel to the Z direction. Further, the imager 20 is fixed to the base plate 52. The Y-direction slider 54 supports the base plate 52 so that the base plate 52 is movable in the Y direction. The Y-direction actuator 56 moves the base plate 52 in the Y direction. The X-direction slider 58 supports the base plate 52, the Y-direction slider 54, and the Y-direction actuator 56 so that the base plate 52, the Y-direction slider 54, and the Y-direction actuator 56 are movable in the X direction. The X-direction actuator 62 moves the X-direction slider 58 in the X direction.

For example, in a case where a camera shake is detected by the angular velocity sensor 28, the controller 24 drives the X-direction actuator 62 and the Y-direction actuator 56 in a direction where the camera shake is to be cancelled to cause the imager 20 to move in the X direction and the Y direction. Since the imager 20 is moved, the shift (corresponding to the amount of camera shake) of the optical image ZA on the image forming surface 21 of the imager 20 is corrected. The camera shake may be corrected on the basis of the detection results of the acceleration sensor 26 and the angular velocity sensor 28.

<Coil Spring>

The six coil springs 60 shown in FIG. 6 are distinguished as coil springs 60A, 60B, 60C, 60D, 60E, and 60F. The coil springs 60A, 60B, 60C, 60D, 60E, and 60F are in contact with the camera body 12 (see FIG. 1) and the frame member 32 so that the axial directions (extension/contraction directions) of the coil springs are parallel to the Y direction, and cause loads (restoring forces) to act on the frame member 32.

The coil spring 60A is disposed on one side of the imaginary straight line A1 (a side where the opening portion 34A is disposed) and on the lower side in the Y direction in a case where the coil spring 60A is viewed in the Z direction. One end portion of the coil spring 60A in the axial direction is in contact with the standing wall portion 38B (see FIG. 1). The standing wall portion 38B is not shown in FIG. 6. The other end portion of the coil spring 60A in the axial direction is in contact with the standing plate portion 15. The coil spring 60A is disposed in, for example, a compressed state and causes a load F1 [N] (see FIG. 7) to act on the frame member 32 upward in the Y direction. An imaginary point where the central axis of the coil spring 60A and the standing wall portion 38B cross each other is referred to as a point A. A distance in the X direction between the imaginary straight line A1 and the point A is referred to as a distance L1 [mm] (see FIG. 7).

The coil spring 60B is disposed on the other side of the imaginary straight line A1 (a side where the motor 48A is disposed) and on the lower side in the Y direction in a case where the coil spring 60B is viewed in the Z direction. One end portion of the coil spring 60B in the axial direction is in contact with the standing wall portion 38B (see FIG. 1). The other end portion of the coil spring 60B in the axial direction is in contact with the standing plate portion 15. The coil spring 60B is disposed in, for example, a compressed state and causes a load F2 [N] (see FIG. 7) to act on the frame member 32 upward in the Y direction. An imaginary point where the central axis of the coil spring 60B and the standing wall portion 38B cross each other is referred to as a point B. A distance in the X direction between the imaginary straight line A1 and the point B is referred to as a distance L2 [mm] (see FIG. 7).

The coil spring 60C is disposed on one side of the imaginary straight line A1 and on the upper side in the Y direction in a case where the coil spring 60C is viewed in the Z direction. That is, the coil spring 60C is disposed with an interval between itself and the coil spring 60A in the Y direction. One end portion of the coil spring 60C in the axial direction is in contact with the standing wall portion 38B (see FIG. 1). The other end portion of the coil spring 60C in the axial direction is in contact with the standing plate portion 15. The coil spring 60C is disposed in, for example, a compressed state and causes a load F3 [N] (see FIG. 7) to act on the frame member 32 downward in the Y direction. An imaginary point where the central axis of the coil spring 60C and the standing wall portion 38B cross each other is referred to as a point C. A distance in the X direction between the imaginary straight line A1 and the point C is referred to as a distance L3 [mm] (see FIG. 7).

The coil spring 60D is disposed on the other side of the imaginary straight line A1 and on the upper side in the Y direction in a case where the coil spring 60D is viewed in the Z direction. That is, the coil spring 60D is disposed with an interval between itself and the coil spring 60B in the Y direction. One end portion of the coil spring 60D in the axial direction is in contact with the standing wall portion 38B (see FIG. 1). The other end portion of the coil spring 60D in the axial direction is in contact with the standing plate portion 15. The coil spring 60D is disposed in, for example, a compressed state and causes a load F4 [N] (see FIG. 7) to act on the frame member 32 downward in the Y direction. An imaginary point where the central axis of the coil spring 60D and the standing wall portion 38B cross each other is referred to as a point D. A distance in the X direction between the imaginary straight line A1 and the point D is referred to as a distance L4 [mm] (see FIG. 7).

The coil spring 60E is disposed on the imaginary straight line A1 and on the lower side in the Y direction in a case where the coil spring 60E is viewed in the Z direction. One end portion of the coil spring 60E in the axial direction is in contact with the standing wall portion 38B (see FIG. 1). The other end portion of the coil spring 60E in the axial direction is in contact with the standing plate portion 15. The coil spring 60E is disposed in, for example, a compressed state and causes a load F5 [N] (see FIG. 7) to act on the frame member 32 upward in the Y direction. An imaginary point where the central axis of the coil spring 60E and the standing wall portion 38B cross each other is referred to as a point E. A distance in the X direction between the imaginary straight line A1 and the point E is 0 [mm].

The coil spring 60F is disposed on the imaginary straight line A1 and on the upper side in the Y direction in a case where the coil spring 60F is viewed in the Z direction. That is, the coil springs 60E and 60F are disposed on the imaginary straight line A1 at intervals in the Y direction. One end portion of the coil spring 60F in the axial direction is in contact with the standing wall portion 38B (see FIG. 1). The other end portion of the coil spring 60F in the axial direction is in contact with the standing plate portion 15. The coil spring 60F is disposed in, for example, a compressed state and causes a load F6 [N] (see FIG. 7) to act on the frame member 32 downward in the Y direction. An imaginary point where the central axis of the coil spring 60F and the standing wall portion 38B cross each other is referred to as a point F. A distance in the X direction between the imaginary straight line A1 and the point F is 0 [mm].

The coil springs 60A, 60B, 60C, 60D, 60E, and 60F are disposed on at least one side and the other side of the imaginary straight line A1 in the X direction and are in contact with the standing plate portions 15 and the standing wall portions 38B (see FIG. 1) in a case where the coil springs 60A, 60B, 60C, 60D, 60E, and 60F are viewed in the Z direction. Further, the coil springs 60A, 60B, 60C, 60D, 60E, and 60F are aligned with the frame member 32 in the Y direction. The Y direction is the movement direction of the shutter member 42 as already described. The coil springs 60A and 60C are an example of first elastic members. The coil springs 60B and 60D are an example of second elastic members.

Figure 7:
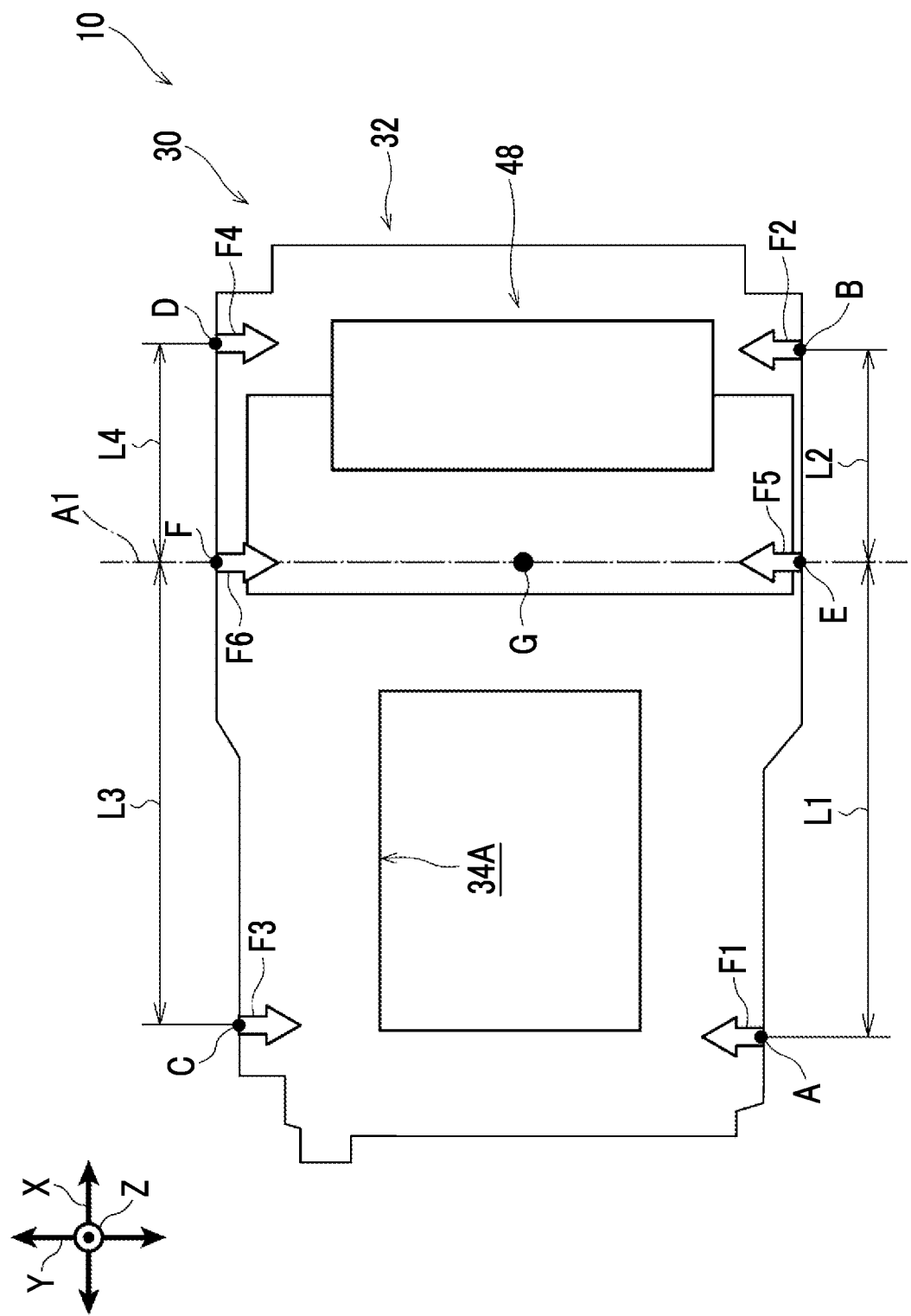
FIG. 7 is a diagram illustrating an example of positions where the loads of the coil springs act on a frame member according to the first embodiment and the acting loads.

For example, L1=L3, L2=L4, and L1>L2 are satisfied in a schematic diagram of the shutter 30 shown in FIG. 7. Here, F1=F3, F2=F4, and F1<F2 are satisfied. That is, among the loads F1, F2, F3, and F4 of the coil springs 60A, 60B, 60C, and 60D, the loads of which the distances from the imaginary straight line A1 are longer are set to be smaller than the loads of which the distances from the imaginary straight line A1 are shorter. For example, F5=F6 is satisfied. The length of the arrow of each load is irrelevant to the magnitude of the load.

Further, in this embodiment, for example, the loads F1, F2, F3, and F4 and the distances L1, L2, L3, and L4 are set to satisfy a first relational expression (F1×L1=F2×L2) and to satisfy a second relational expression (F3×L3=F4×L4). The loads F1, F2, F3, F4, F5, and F6 and the distances L1, L2, L3, and L4 are set in a range where the rotational movement of the shutter 30 about the center G of gravity in an allowable range is not restricted.

With regard to the loads F1, F2, F3, and F4 and the distances L1, L2, L3, and L4, the loads of which the distances from the first imaginary straight line A1 are longer are smaller than the loads of which the distances from the first imaginary straight line A1 are shorter. A method of changing the spring constants [N/mm] of the coil springs 60A, 60B, 60C, and 60D may be used as a specific method of changing a load. As a method of changing a spring constant, there are, for example, a method of changing the thickness of a spring, a method of changing the material of a spring, and a method of changing the winding diameter (inner diameter) of a spring.

[Action]

Next, the actions of the digital camera 10 and a vibration suppression method for the digital camera 10 according to the first embodiment will be described.

Since the six coil springs 60 are in contact with the frame member 32 in the digital camera 10 shown in FIG. 1, the frame member 32 is supported in the Y direction. Accordingly, the frame member 32 does not need to be rigidly connected to the camera body 12. Since the frame member 32 is not rigidly connected to the camera body 12, the transmission of an impact force to the camera body 12 from the shutter 30 can be suppressed as compared to configuration where the frame member 32 is rigidly connected. In other words, since the digital camera 10 is adapted so that the movement of the frame member 32 is allowed in an allowable range by the six coil springs 60, the transmission of an impact force to the camera body 12 from the shutter 30 can be suppressed.

Figure 8:
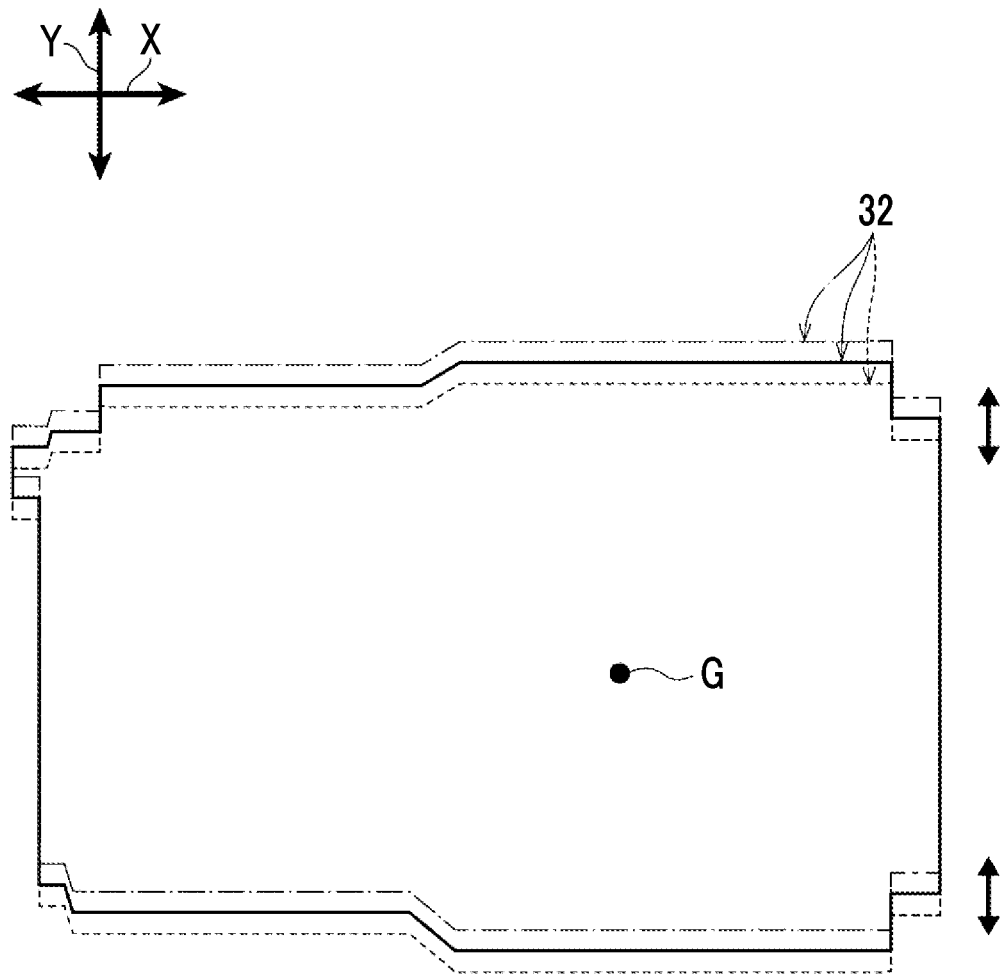
FIG. 8 is a diagram illustrating an example of a state where the entire shutter according to the first embodiment moves in a Y direction.
Figure 9:
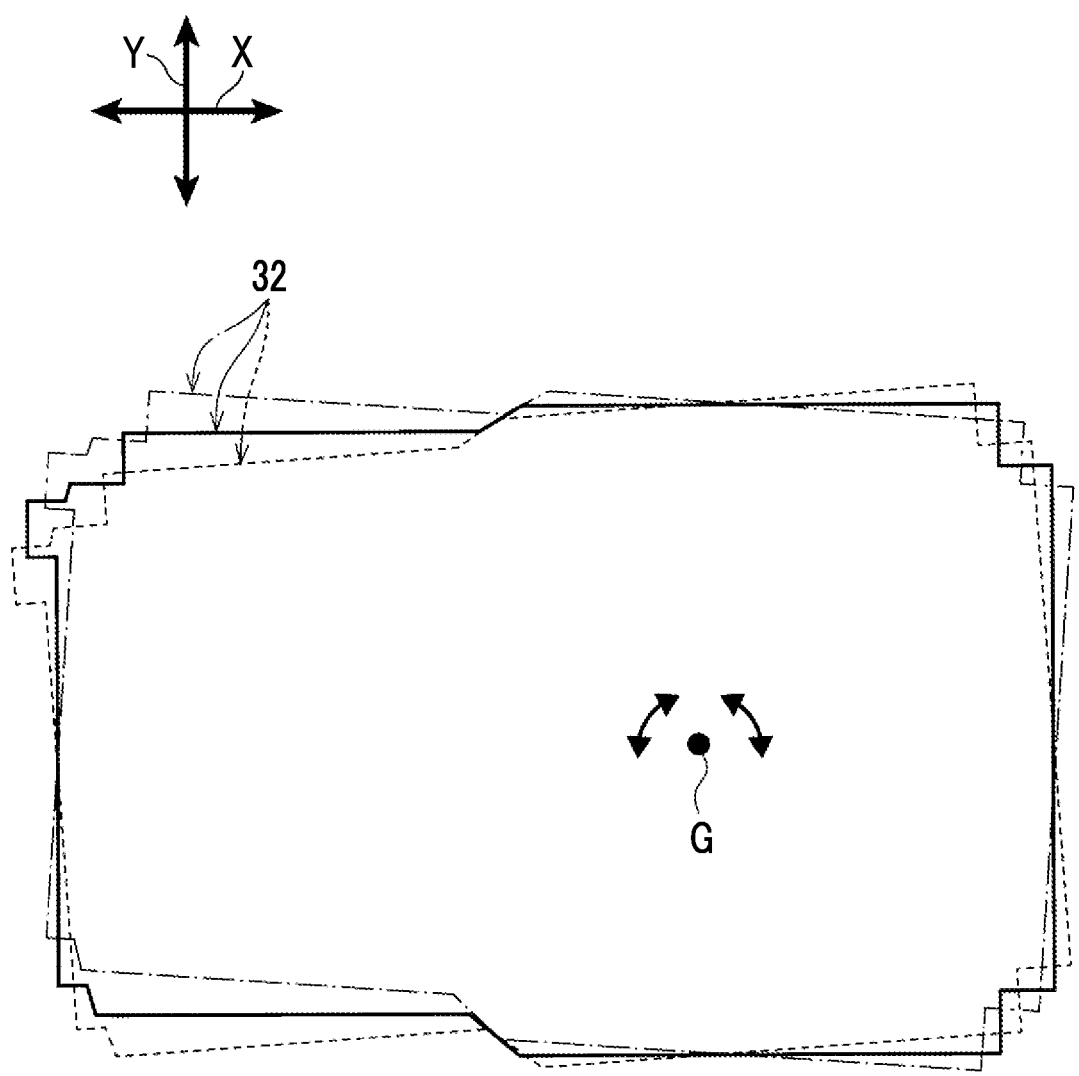
FIG. 9 is a diagram illustrating an example of a state where the entire shutter according to the first embodiment moves rotationally about the center of gravity.

In a case where the shutter button 18 (see FIG. 2) is operated, the shutter member 42 (the front curtain member 43 and the rear curtain member 46) is moved in the Y direction in the shutter 30 shown in FIG. 3. Since an impact force acts on the frame member 32 in a case where the shutter member 42 is moved in the Y direction, the frame member 32 may be linearly moved (vibrated) in the Y direction (see FIG. 8). Further, since the impact force acts on the frame member 32, the frame member 32 may be rotated about the center G of gravity (see FIG. 9). Here, the impact force acting on the frame member 32 is reduced by the loads (restoring forces) of the six coil springs 60. That is, the transmission of the impact force to the camera body 12 (see FIG. 1) from the shutter 30 can be suppressed. The opening portion 34A (see FIG. 1) is not shown in FIGS. 8 and 9.

Furthermore, the plurality of coil springs 60 are disposed on one side and the other side of the imaginary straight line A1, which passes through the center G of gravity, in the X direction in the digital camera 10 shown in FIG. 6. Since the plurality of coil springs 60 are disposed on one side and the other side of the imaginary straight line A1, the rotation of the shutter 30 (frame member 32) about the center G of gravity, which is biased in one direction, is suppressed. Since the biased rotation of the shutter 30 is suppressed, the contact between the shutter 30 and the camera body 12 (see FIG. 1) is suppressed. Accordingly, the transmission of an impact force to the camera body 12 from the shutter 30 can be suppressed.

Since the transmission of the impact force to the camera body 12 from the shutter 30 is suppressed as described above in the digital camera 10 shown in FIG. 1, an impact force to be transmitted to the correction unit 50 (see FIG. 2) is reduced. Accordingly, the erroneous correction of the correction unit 50 can be suppressed. The erroneous correction of the correction unit 50 means an error of correction that causes, for example, the vignetting of the optical image ZA (see FIG. 2), the positional deviation of the optical image ZA, a reduction in the resolution of the optical image ZA, or the like.

Further, the coil springs 60E and 60F are disposed on the imaginary straight line A1 in the digital camera 10 shown in FIG. 6. In other words, since the coil springs 60E and 60F are disposed at positions closer to the center G of gravity than the coil springs 60A, 60B, 60C, and 60D, an impact force acting on the shutter 30 at a position close to the center G of gravity is reduced. Since the impact force acting on the shutter 30 at a position close to the center G of gravity is reduced, an increase in the impact force acting on the correction unit 50 (see FIG. 2) is suppressed. Accordingly, the erroneous correction of the correction unit 50 can be suppressed.

Furthermore, the plurality of coil springs 60 are disposed in the digital camera 10 in a movement direction of the frame member 32 corresponding to the movement of the shutter member 42 (see FIG. 3). That is, since the movement direction of the frame member 32 and a direction where the coil springs 60 are elastically deformed are aligned with each other, the movement of the frame member 32 can be suppressed even though the number of the coil springs 60 is not increased more than necessary.

In addition, in the digital camera 10, among the loads of the plurality of coil springs 60, the loads of which the distances from the imaginary straight line A1 are longer are smaller than the loads of which the distances from the imaginary straight line A1 are shorter. Accordingly, the rotation angle of the shutter 30 is reduced as compared to configuration where a load is larger as the distance is longer. That is, the rotation of the shutter 30 about the center G of gravity can be suppressed.

Further, the loads F1 and F2 and the distances L1 and L2 satisfy the relational expression (F1×L1=F2×L2) in the digital camera 10 shown in FIG. 7. In other words, the coil springs 60 (see FIG. 6) can evenly resist against an impact force, which is caused by the movement of the shutter member 42 (see FIG. 3), on one side and the other side of the imaginary straight line A1. Since the coil springs 60 evenly resist, the rotation of the shutter 30 about the center G of gravity, which is biased to one side, can be suppressed.

Furthermore, the frame member 32 is formed in a polygonal shape in the digital camera 10 in a case where the frame member 32 is viewed in the Z direction. In other words, since the area of a flat portion of the outer peripheral surface of the frame member 32 is increased as compared to configuration where the outer peripheral surface of the frame member 32 is formed of a curved surface, the contact area between the frame member 32 and the coil springs 60 (see FIG. 6) can be increased.

In addition, the frame member 32 is housed in the camera body 12 in the digital camera 10 shown in FIG. 1. That is, since a part of the camera body 12 and the shutter 30 are disposed so as to overlap each other in the Z direction, the size of the digital camera 10 in the Z direction can be reduced as compared to configuration where the shutter 30 is not housed in the camera body 12.

In the vibration suppression method for the digital camera 10, the coil springs 60 are disposed on one side and the other side of the imaginary straight line A1 in the X direction in a case where the coil springs 60 are viewed in the Z direction. Further, since the frame member 32 is supported by the camera body 12 through the coil springs 60, the vibration of the shutter 30 is suppressed. That is, since the coil springs 60 are in contact with the frame member 32, the transmission of an impact force to the camera body 12 from the shutter 30 is suppressed, that is, an impact force to be transmitted to the correction unit 50 is reduced. Accordingly, the erroneous correction of the correction unit 50 can be suppressed.

Second Embodiment

Next, examples of an imaging device and a vibration suppression method for the imaging device according to a second embodiment will be described. The same components as those of the first embodiment will be denoted by the same reference numerals as those of the first embodiment and the description of the structures and actions thereof will be omitted.

Figure 10:
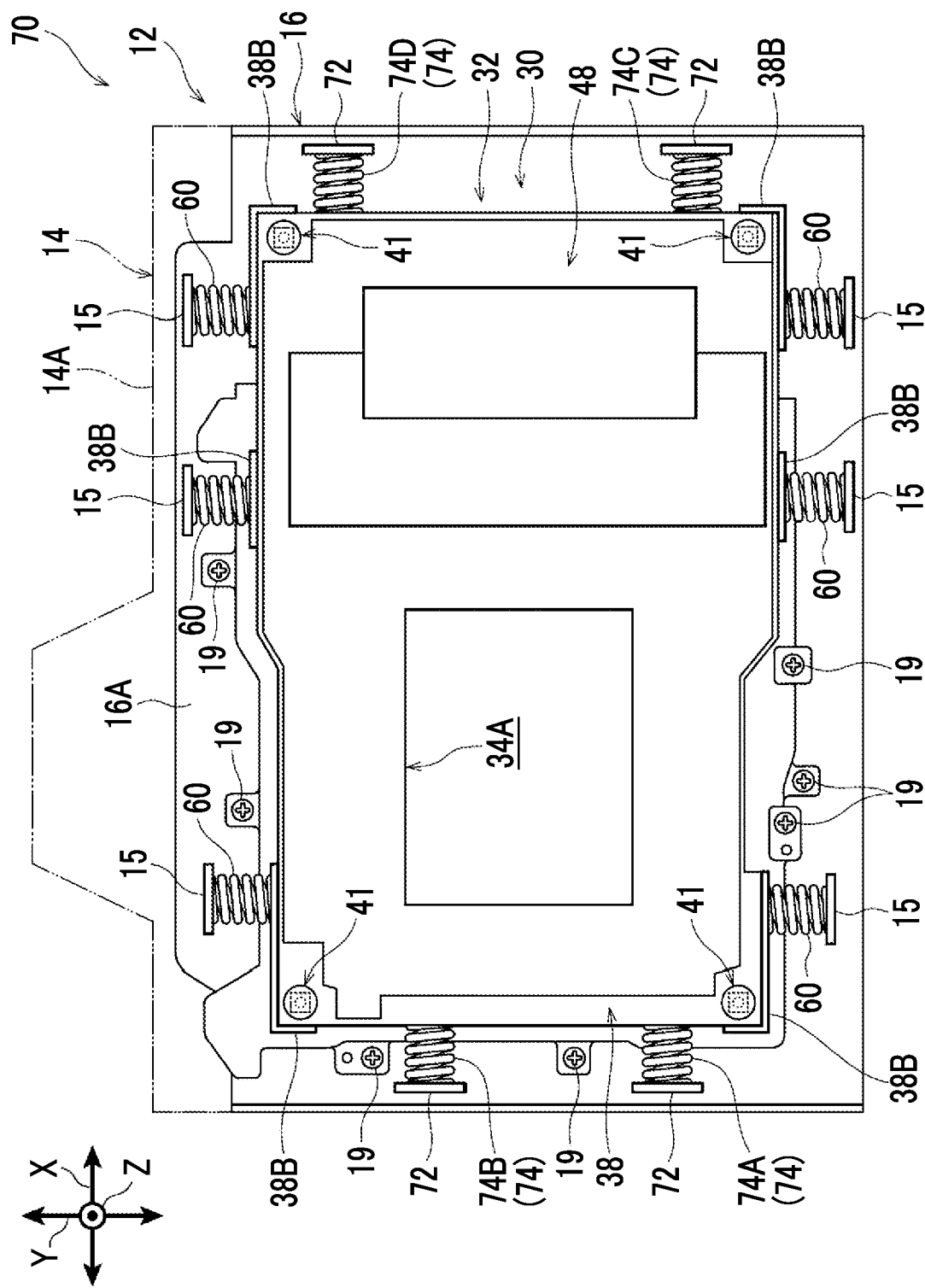
FIG. 10 is a diagram illustrating an example of a camera body and a shutter of a digital camera according to a second embodiment.

FIG. 10 shows a digital camera 70 as an example of an imaging device according to the second embodiment. The digital camera 70 has configuration where, for example, four standing plate portions 72 and four coil springs 74 are added to the already-described digital camera 10 (see FIG. 1) on both sides of the shutter 30 in the X direction. The basic configuration of the digital camera 70 except for the four standing plate portions 72 and the four coil springs 74 is the same as that of the digital camera 10.

The four standing plate portions 72 stand on the back surface of the front cover member 14A in the Z direction and on one side and the other side of the shutter 30 in the X direction from the base member 16 toward the imager 20 (see FIG. 2). Further, the four standing plate portions 72 are disposed at intervals in the X direction on one side and the other side of the frame member 32 in the X direction in a case where the four standing plate portions 72 are viewed in the Z direction. Furthermore, the four standing plate portions 72 are disposed so that the thickness directions of the standing plate portions 72 are parallel to the X direction. The outer shape of each of the four standing plate portions 72 is a quadrangular shape in a case where the four standing plate portions 72 are viewed in the X direction.

The four coil springs 74 are an example of a plurality of auxiliary elastic members. The four coil springs 74 are distinguished as coil springs 74A, 74B, 74C, and 74D. The coil springs 74A, 74B, 74C, and 74D are in contact with the standing plate portions 72 and the frame member 32 so that the axial directions (extension/contraction directions) of the coil springs are parallel to the X direction, and cause loads (restoring forces) to act on the frame member 32. The coil springs 74A and 74C are an example of a third elastic member and are disposed at intervals in the X direction. The coil springs 74B and 74D are an example of a fourth elastic member and are disposed at intervals in the X direction.

Figure 11:
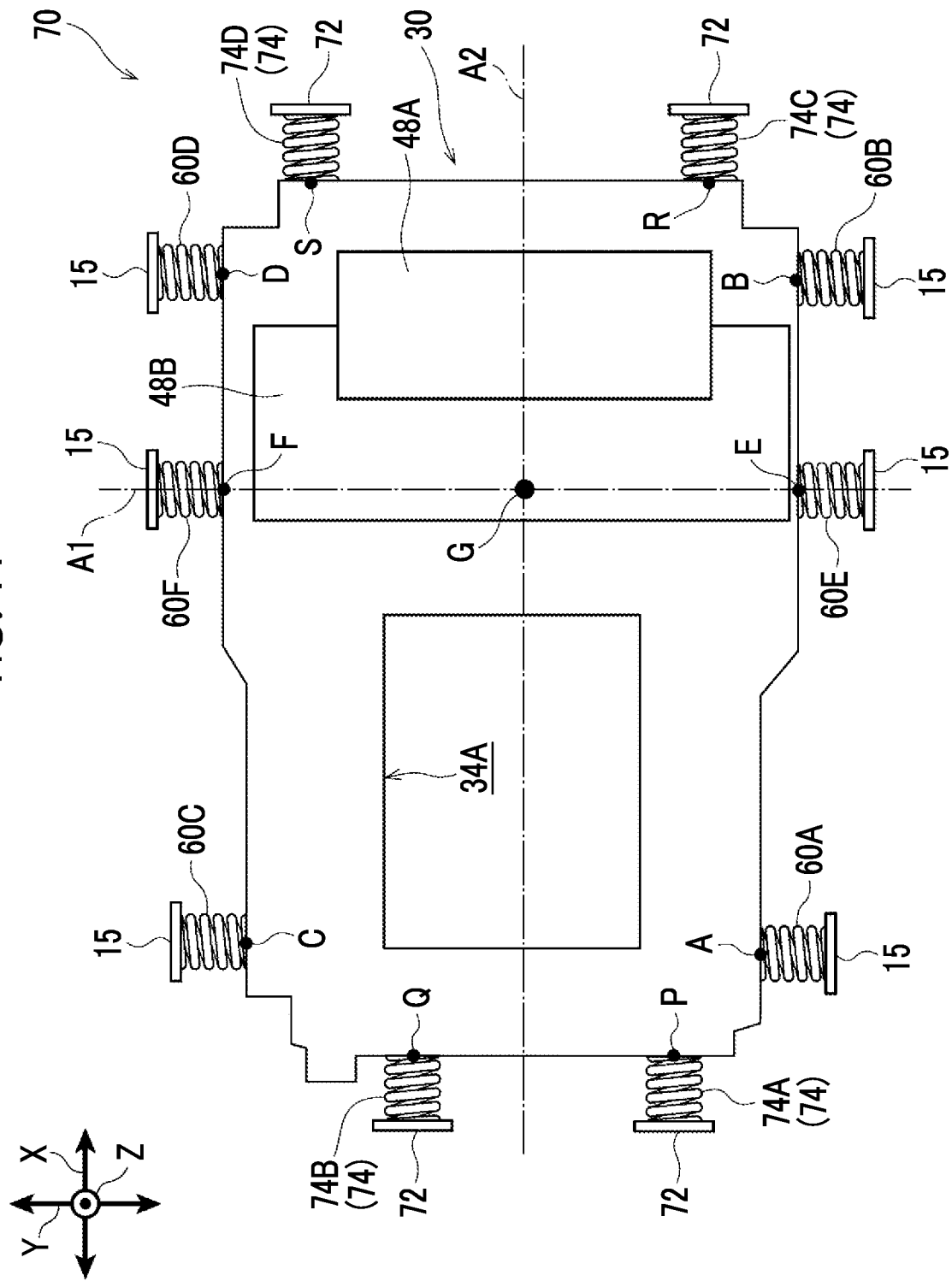
FIG. 11 is a diagram illustrating an example of a state where a plurality of coil springs according to the second embodiment are disposed.

Here, an imaginary straight line, which passes through the center G of gravity of the shutter 30 and extends in the Y direction in a case where the digital camera 70 is viewed in the Z direction in the horizontal attitude state of the digital camera 70 shown in FIG. 11, is referred to as a first imaginary straight line A1. Further, an imaginary straight line, which passes through the center G of gravity and extends in the X direction, is referred to as a second imaginary straight line A2. In other words, imaginary straight lines passing through the center G of gravity include the first imaginary straight line A1 and the second imaginary straight line A2. The first imaginary straight line A1 and the second imaginary straight line A2 are orthogonal to the Z direction that is the direction of an optical axis. Furthermore, the second imaginary straight line A2 is orthogonal to the optical axis K in a case where the second imaginary straight line A2 is viewed in the Y direction.

The coil spring 74A is disposed on one side (lower side) of the second imaginary straight line A2 and on one side of the frame member 32 in the X direction in a case where the coil spring 74A is viewed in the Z direction. One end portion of the coil spring 74A in the axial direction is in contact with the bracket part 38 (see FIG. 10). The bracket part 38 is not shown in FIG. 11. The other end portion of the coil spring 74A in the axial direction is in contact with the standing plate portion 72. The coil spring 74A is disposed in, for example, a compressed state and causes a load FA [N] (see FIG. 12) to act on the frame member 32 toward the other side in the X direction. An imaginary point where the central axis of the coil spring 74A and the bracket part 38 cross each other is referred to as a point P. A distance in the Y direction between the second imaginary straight line A2 and the point P is referred to as a distance LA [mm] (see FIG. 12).

The coil spring 74B is disposed on the other side (upper side) of the second imaginary straight line A2 and on one side of the frame member 32 in the X direction in a case where the coil spring 74B is viewed in the Z direction. One end portion of the coil spring 74B in the axial direction is in contact with the bracket part 38 (see FIG. 10). The other end portion of the coil spring 74B in the axial direction is in contact with the standing plate portion 72. The coil spring 74B is disposed in, for example, a compressed state and causes a load FB [N] (see FIG. 12) to act on the frame member 32 toward the other side in the X direction. An imaginary point where the central axis of the coil spring 74B and the bracket part 38 cross each other is referred to as a point Q. A distance in the Y direction between the second imaginary straight line A2 and the point Q is referred to as a distance LB [mm] (see FIG. 12).

The coil spring 74C is disposed on one side (lower side) of the second imaginary straight line A2 and on the other side of the frame member 32 in the X direction in a case where the coil spring 74C is viewed in the Z direction. One end portion of the coil spring 74C in the axial direction is in contact with the bracket part 38 (see FIG. 10). The other end portion of the coil spring 74C in the axial direction is in contact with the standing plate portion 72. The coil spring 74C is disposed in, for example, a compressed state and causes a load FC [N] (see FIG. 12) to act on the frame member 32 toward one side in the X direction. An imaginary point where the central axis of the coil spring 74C and the bracket part 38 cross each other is referred to as a point R. A distance in the Y direction between the second imaginary straight line A2 and the point R is referred to as a distance LC [mm] (see FIG. 12).

The coil spring 74D is disposed on the other side (upper side) of the second imaginary straight line A2 and on the other side of the frame member 32 in the X direction in a case where the coil spring 74D is viewed in the Z direction. One end portion of the coil spring 74D in the axial direction is in contact with the bracket part 38 (see FIG. 10). The other end portion of the coil spring 74D in the axial direction is in contact with the standing plate portion 72. The coil spring 74D is disposed in, for example, a compressed state and causes a load FD [N] (see FIG. 12) to act on the frame member 32 toward one side in the X direction. An imaginary point where the central axis of the coil spring 74D and the bracket part 38 cross each other is referred to as a point S. A distance in the Y direction between the second imaginary straight line A2 and the point S is referred to as a distance LD [mm] (see FIG. 12).

Figure 12:
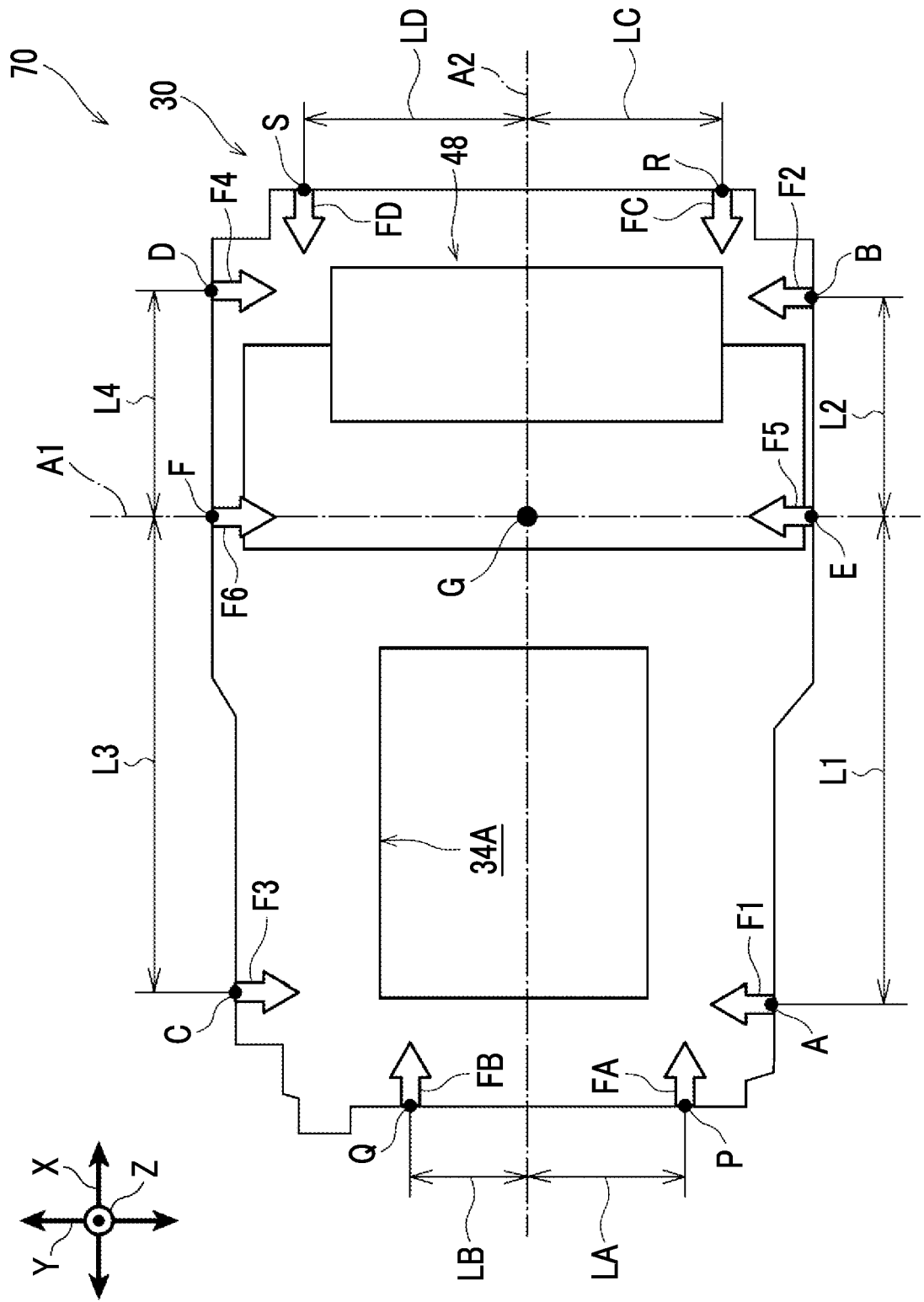
FIG. 12 is a diagram illustrating an example of positions where the loads of the coil springs act on a frame member according to the second embodiment and the acting loads.

FIG. 12 schematically shows a state in which the shutter 30, the six coil springs 60 (see FIG. 11), and the four coil springs 74 (see FIG. 11) are disposed and which is viewed in the Z direction. In this embodiment, for example, the loads FA, FB, FC, and FD and the distances LA, LB, LC, and LD are set to satisfy a first relational expression (FA×LA=FB×LB) and to satisfy a second relational expression (FC×LC=FD×LD). The loads FA, FB, FC, and FD and the distances LA, LB, LC, and LD are set in a range where the rotational movement of the shutter 30 about the center G of gravity in an allowable range is not restricted. Further, for example, (FA×LA)+(FB×LB)=(FC×LC)+(FD×LD) is satisfied in this embodiment.

With regard to the loads FA, FB, FC, and FD and the distances LA, LB, LC, and LD, the loads of which the distances from the second imaginary straight line A2 are longer are smaller than the loads of which the distances from the second imaginary straight line A2 are shorter. A method of changing the spring constants [N/mm] of the coil springs 74A, 74B, 74C, and 74D may be used as a specific method of changing a load. As a method of changing a spring constant, there are, for example, a method of changing the thickness of a spring, a method of changing the material of a spring, and a method of changing the winding diameter (inner diameter) of a spring.

[Action]

Next, the action of the digital camera 70 according to the second embodiment will be described. Since the actions of the six coil springs 60 in the already-described horizontal attitude state (the actions in a case where the six coil springs 60 are disposed with respect to the first imaginary straight line A1) are the same as those of the first embodiment, the description thereof will be omitted.

In a case where a state where the digital camera 70 shown in FIG. 10 is used is changed to a vertical attitude state from a horizontal attitude state, the shutter 30 intends to move downward from the original position in the X direction (vertical direction) due to the dead weight of the shutter 30. Here, since the loads (restoring forces) of the plurality of coil springs 74 act as resistance forces against the dead weight of the shutter 30, the downward movement of the shutter 30 in the X direction can be suppressed.

Further, the four coil springs 74 are disposed in the digital camera 70 shown in FIG. 11 on the upper and lower sides of the second imaginary straight line A2, which passes through the center G of gravity, in the Y direction. Since the plurality of coil springs 74 are disposed on the upper and lower sides of the second imaginary straight line A2, the rotation of the shutter 30 about the center G of gravity, which is biased in one direction, is suppressed. Since the biased rotation of the shutter 30 is suppressed, the contact between the shutter 30 and the camera body 12 (see FIG. 10) is suppressed. Accordingly, the transmission of an impact force to the camera body 12 from the shutter 30 in a case where the shutter 30 is operated can be suppressed. Furthermore, since the transmission of the impact force to the camera body 12 from the shutter 30 is suppressed, an impact force to be transmitted to the correction unit 50 (see FIG. 2) is reduced. Accordingly, the erroneous correction of the correction unit 50 can be suppressed.

In addition, the loads FA and FB and the distances LA and LB satisfy the relational expression (FA×LA=FB×LB) in the digital camera 70 shown in FIG. 12. In other words, since the coil springs 74 can evenly resist on one side and the other side of the second imaginary straight line A2, the rotation of the shutter 30 about the center G of gravity, which is biased in one direction, can be suppressed.

Third Embodiment

Next, examples of an imaging device and a vibration suppression method for the imaging device according to a third embodiment will be described. The same components as those of the first and second embodiments will be denoted by the same reference numerals as those of the first and second embodiments and the description of the structures and actions thereof will be omitted.

Figure 13:
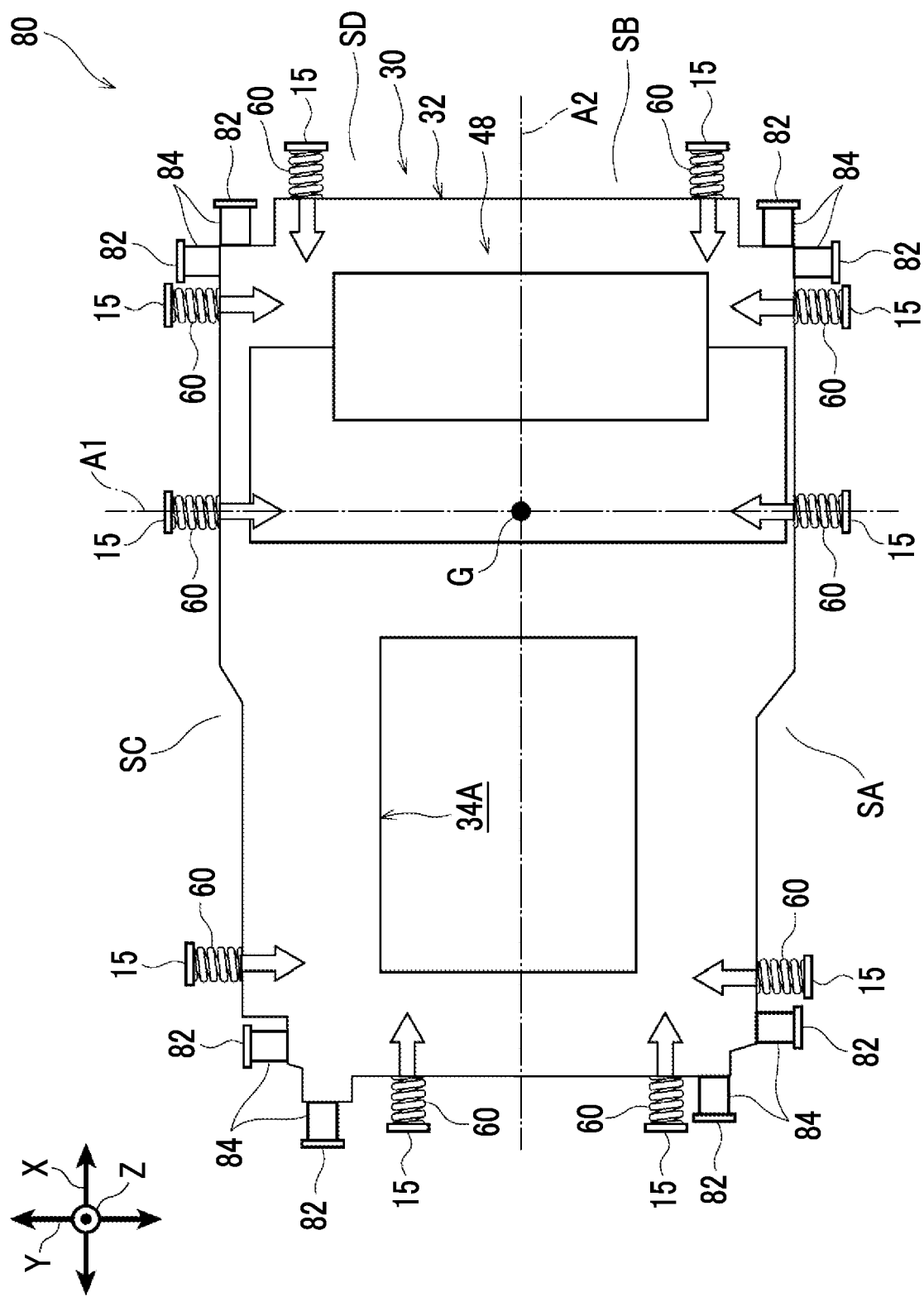
FIG. 13 is a diagram illustrating an example of a state where a plurality of coil springs and a plurality of rubber members according to a third embodiment are disposed.

FIG. 13 shows a part of a digital camera 80 as an example of an imaging device according to the third embodiment. The digital camera 80 has configuration where eight standing plate portions 82 and eight rubber members 84 are added to the already-described digital camera 70 (see FIG. 10). The basic configuration of the digital camera 80 except for the standing plate portions 82 and the rubber members 84 is the same as that of the digital camera 70. In FIG. 13, only the eight standing plate portions 82 formed at the camera body 12 (see FIG. 1) are shown and other components of the camera body 12 are not shown.

The eight standing plate portions 82 stand toward the imager 20 (see FIG. 2) on the back surface of the front cover member 14A (see FIG. 1) in the Z direction, on one side and the other side of the shutter 30 in the X direction, and on the upper and lower sides in the Y direction. Further, among the eight standing plate portions 82, four standing plate portions 82 are disposed so as to face the frame member 32 in the Y direction and the other four standing plate portions 82 are disposed so as to face the frame member 32 in the X direction. The outer shape of each of the eight standing plate portions 72 is a quadrangular shape in a case where the eight standing plate portions 72 are viewed in the X direction or the Y direction.

The eight rubber members 84 are an example of a plurality of damping members. Further, the eight rubber members 84 are made of, for example, silicone rubber. All of the eight rubber members 84 are formed in the shape of a rectangular parallelepiped, but the sizes of some of them vary according to the sizes of places where the rubber members are to be disposed. Among the eight rubber members 84, four rubber members 84 are in contact with the standing plate portions 82 and the frame member 32 so that a direction where each rubber member is to be compressed is parallel to the X direction. The other four rubber members 84 are in contact with the standing plate portions 82 and the frame member 32 so that a direction where each rubber member is to be compressed is parallel to the Y direction. In other words, the eight rubber members 84 are sandwiched between the eight standing plate portions 82 and the frame member 32 and have a function to damp the movement (vibration) of the shutter 30 in the X direction and the Y direction.

For example, the eight rubber members 84 are disposed in four imaginary regions SA, SB, SC, and SD divided by the first imaginary straight line A1 and the second imaginary straight line A2 so that one rubber member is disposed along the X direction and one rubber member is disposed along the Y direction in each imaginary region.

Figure 14:
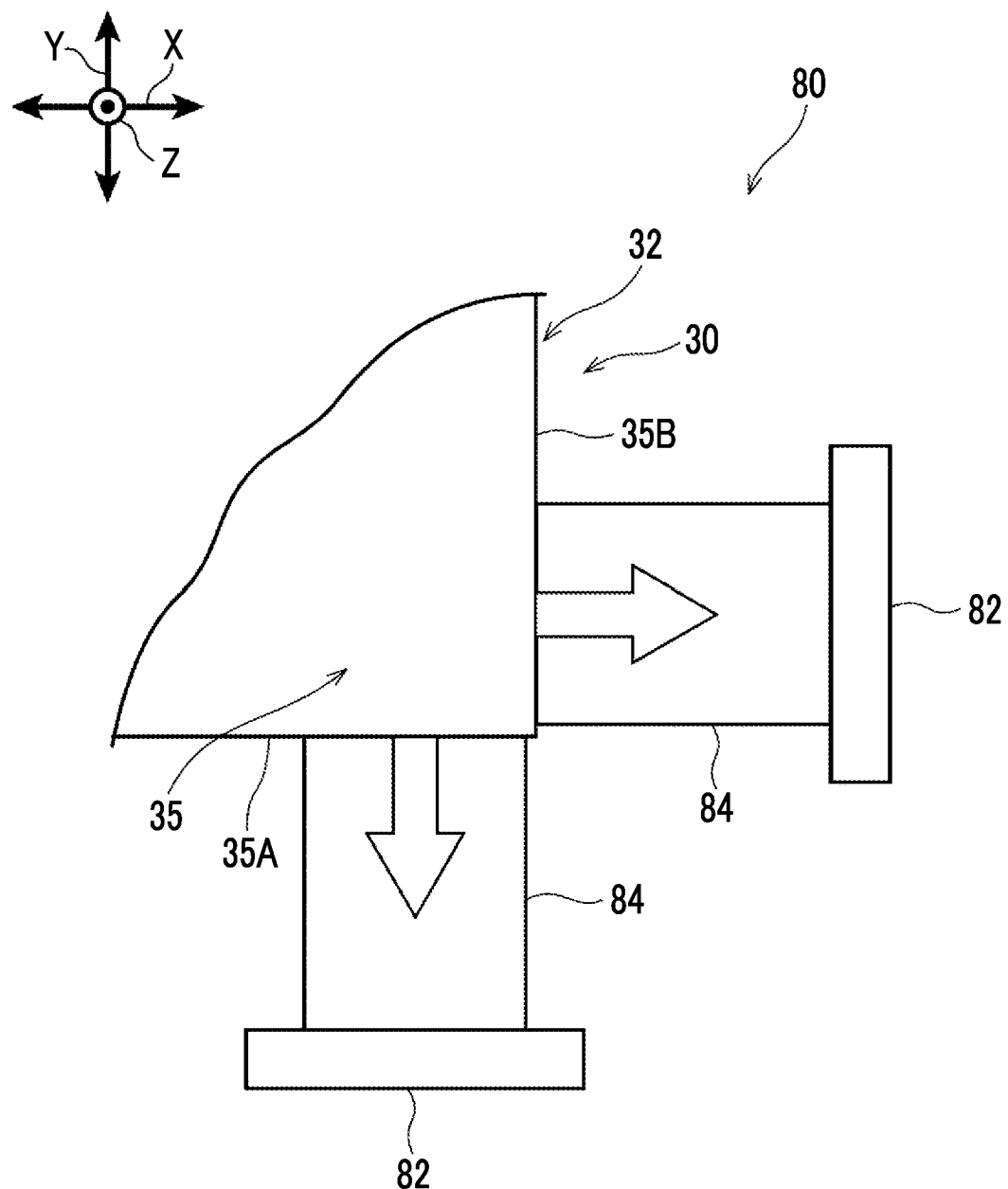
FIG. 14 is a diagram illustrating an example of a state where rubber members being in contact with a corner of a frame member according to the third embodiment are compressed.

FIG. 14 shows a state where one corner 35 of the frame member 32 is enlarged. The corner 35 is formed by, for example, a side surface 35A formed along an X-Z plane and a side surface 35B formed along a Y-Z plane in a case where the corner 35 is viewed in the Z direction. The rubber member 84 compressed in the Y direction is in contact with the side surface 35A. The rubber member 84 compressed in the X direction is in contact with the side surface 35B. In other words, two rubber members 84 are in contact with the side surface 35A and the side surface 35B forming the corner 35 in directions different from each other.

[Action]

Next, the action of the digital camera 80 according to the third embodiment will be described. Since the actions of the already-described coil springs 60 and 74 are the same as those of the first and second embodiments, the description thereof will be omitted.

Figure 15:
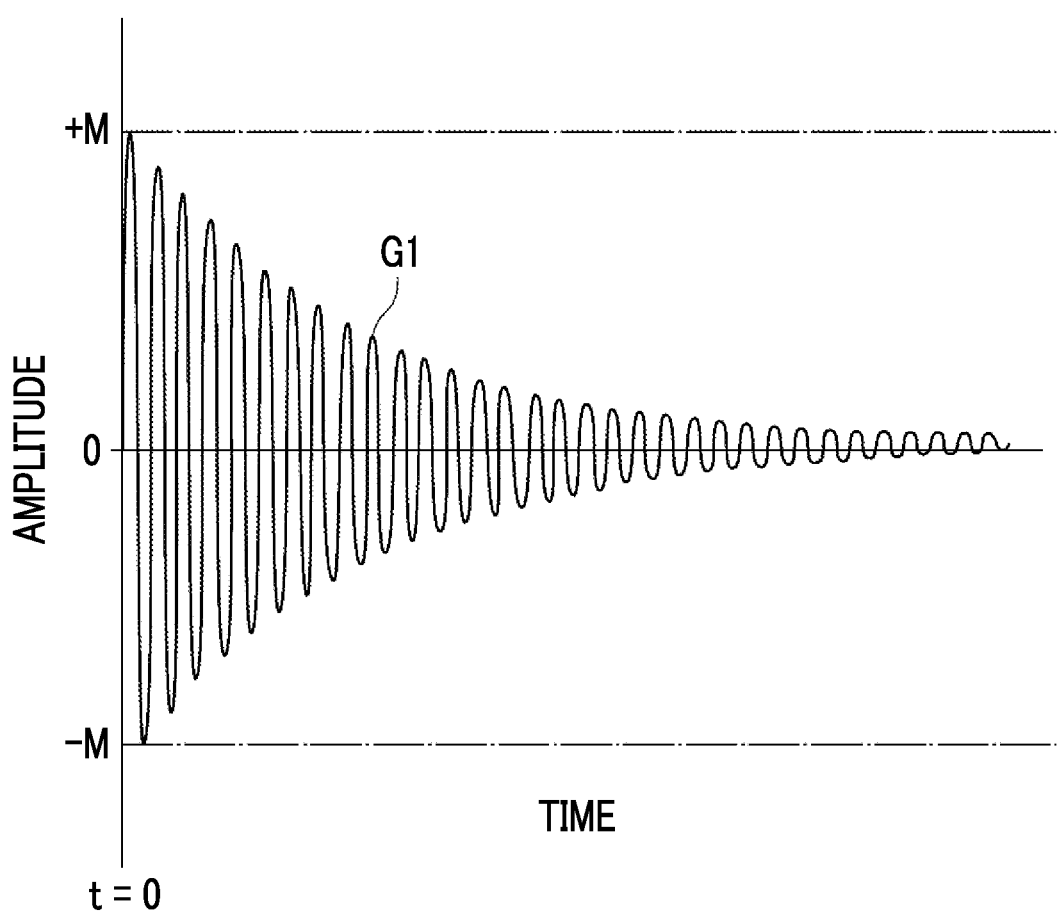
FIG. 15 is a graph showing an example of a state where the amplitude of vibration of a shutter according to the third embodiment is damped over time.

Since the rubber members 84 are disposed in the X direction and the Y direction in the digital camera 80 shown in FIG. 13, the movement (vibration) of the shutter 30 caused by the movement of the shutter member 42 (see FIG. 3) is damped even in any state of the horizontal attitude state and the vertical attitude state. A state where vibration having an amplitude 2M at a point of time (t=0) is damped over time is shown in FIG. 15 by a graph G1.

Since the vibration of the shutter 30 is damped by the eight rubber members 84 in the digital camera 80 shown in FIG. 13, the transmission of an impact force to the camera body 12 (see FIG. 1) from the shutter 30 is suppressed. Since the transmission of the impact force to the camera body 12 from the shutter 30 is suppressed, an impact force to be transmitted to the correction unit 50 (see FIG. 2) is reduced. Accordingly, the erroneous correction of the correction unit 50 can be suppressed.

Further, in the digital camera 80 shown in FIG. 14, the rubber members 84 are in contact with the two side surfaces 35A and 35B forming each corner 35 in directions different from each other in a case where the rubber members 84 are viewed in the Z direction. Here, for example, in a case where the frame member 32 is vibrated in an oblique direction crossing the Y direction, the plurality of rubber members 84, which are in contact with the corner 35 in directions different from each other, damp vibration in the X direction and the Y direction. That is, the amplitude of vibration of the shutter 30 can be reduced regardless of a direction where the frame member 32 is vibrated.

Fourth Embodiment

Next, examples of an imaging device and a vibration suppression method for the imaging device according to a fourth embodiment will be described. The same components as those of the first, second, and third embodiments will be denoted by the same reference numerals as those of the first, second, and third embodiments and the description of the structures and actions thereof will be omitted.

Figure 16:
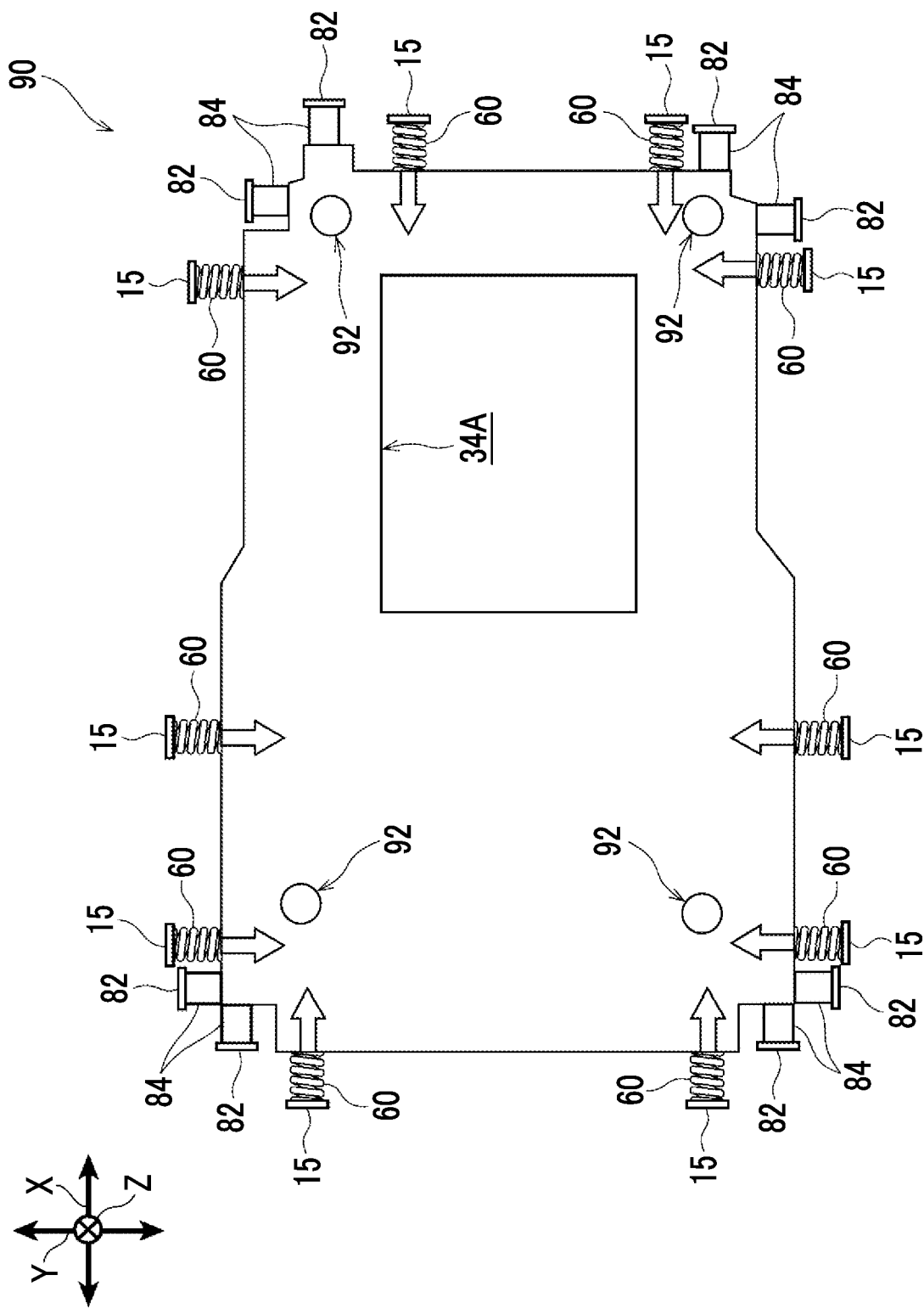
FIG. 16 is a diagram illustrating an example of positions where sponge members are in contact with a frame member according to a fourth embodiment.

FIG. 16 shows a part of a digital camera 90 as an example of an imaging device according to the fourth embodiment. The digital camera 90 has configuration where four sponge members 92 as examples of damping members and friction members are added to the already-described digital camera 80 (see FIG. 13). The basic configuration of the digital camera 90 except for the sponge members 92 is the same as that of the digital camera 80.

Figure 17:
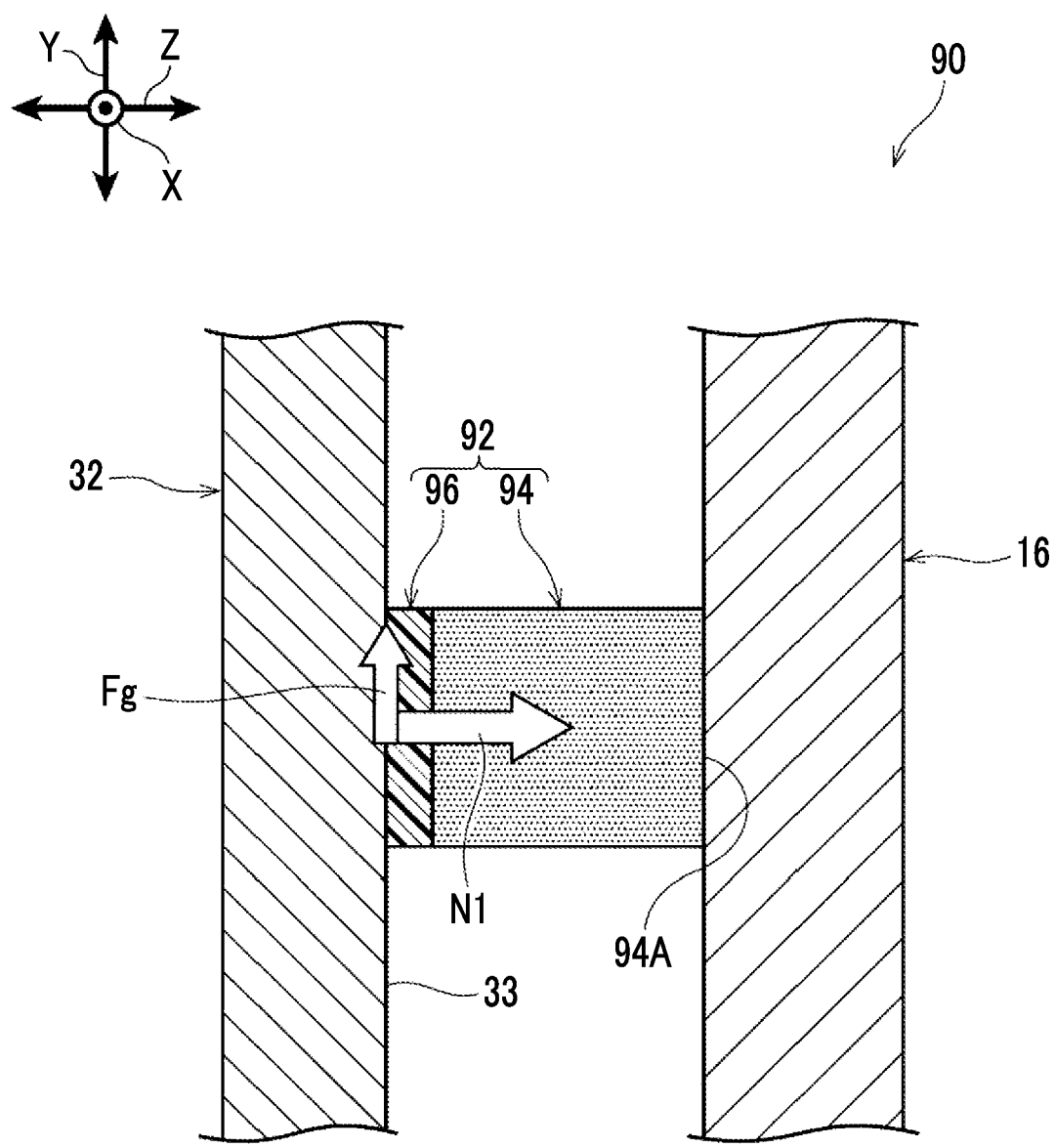
FIG. 17 is a diagram illustrating an example of a state where the sponge member according to the fourth embodiment causes a friction force to act on the frame member.

The sponge member 92 shown in FIG. 17 includes, for example, a columnar sponge body 94 of which the direction of a central axis is parallel to the Z direction, and a frictional sliding sheet 96 that is fixed to one end face of the sponge body 94 in the Z direction. The sponge members 92 are disposed at, for example, the four corners of the frame member 32 in a case where the respective sponge members 92 are viewed in the Z direction.

Further, each sponge member 92 is sandwiched between the frame member 32 and the base member 16, which faces the imager 20 (see FIG. 2), in the Z direction. Specifically, the other end face 94A of the sponge body 94 in the Z direction adheres to the base member 16. Further, the frictional sliding sheet 96 is in contact with the back surface 33 of the frame member 32, which faces the imager 20 side, in the Z direction. In a case where a normal force N1 [N] acts on the sponge body 94 and the frictional sliding sheet 96 in the Z direction and the coefficient of static friction of an interface between the frame member 32 and the frictional sliding sheet 96 is denoted by μ, a friction force Fg [N] at the initial stage of the movement of the frame member 32 satisfies Fg=μN1.

[Action]

Next, the action of the digital camera 90 according to the fourth embodiment will be described. Since the actions of the coil springs 60, the coil springs 74, and the rubber members 84 having been already described are the same as those of the first, the second, and third embodiments, the description thereof will be omitted.

In a case where the vibration of the shutter 30 caused by the movement of the shutter member 42 (see FIG. 3) is generated in the digital camera 90 shown in FIGS. 16 and 17, a friction force equal to or smaller than a friction force Fg acts on the frame member 32. Since the friction force acts on the frame member 32, the vibration of the frame member 32 is damped. That is, since the vibration of the shutter 30 is damped by the friction forces of the four sponge members 92, the transmission of an impact force to the camera body 12 (see FIG. 1) from the shutter 30 is suppressed. Since the transmission of the impact force to the camera body 12 from the shutter 30 is suppressed, an impact force to be transmitted to the correction unit 50 (see FIG. 2) is reduced. Accordingly, the erroneous correction of the correction unit 50 can be suppressed.

Fifth Embodiment

Next, examples of an imaging device and a vibration suppression method for the imaging device according to a fifth embodiment will be described. The same components as those of the first, second, third, and fourth embodiments will be denoted by the same reference numerals as those of the first, second, third, and fourth embodiments and the description of the structures and actions thereof will be omitted.

Figure 18:
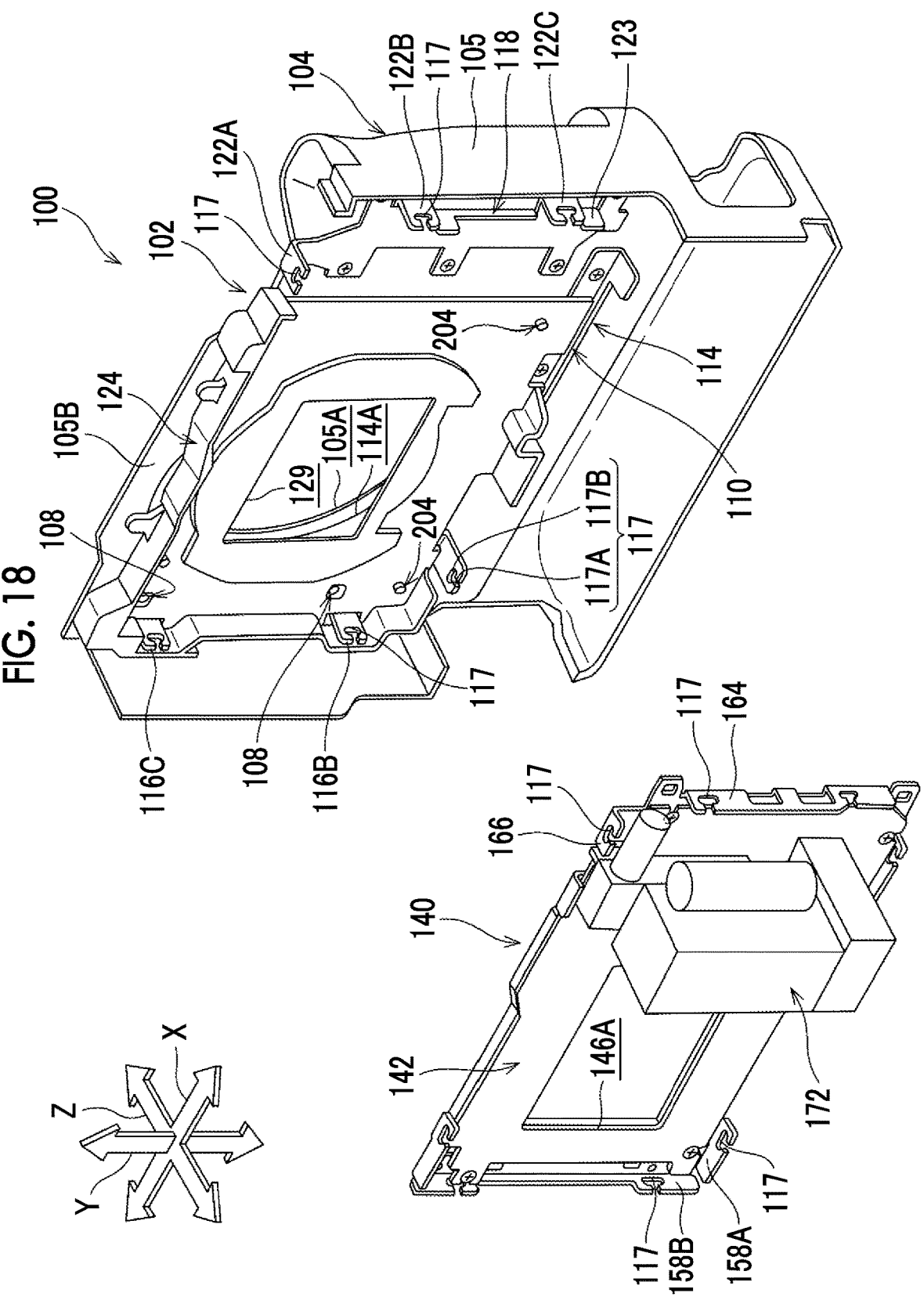
FIG. 18 is a perspective view showing an example of a camera body and a shutter of a digital camera according to a fifth embodiment.

FIG. 18 shows main portions of a digital camera 100 as an example of an imaging device according to the fifth embodiment. The digital camera 100 includes a camera body 102, an imaging lens unit 17, an imager 20 (see FIG. 20), a shutter 140, a correction unit 50 (see FIG. 20), and four spring units 192 (see FIG. 21) as an example of a plurality of elastic members. Further, the digital camera 100 is provided with rubber members 202 (see FIG. 21) as an example of an impact absorbing member, sponge members 204 (see FIG. 19) as an example of a sliding member, and shoulder screws 208 (see FIG. 21) as an example of a fastening member.

<Camera Body>

The camera body 102 shown in FIG. 18 is an example of a device body. Further, the camera body 102 includes a cover member 104 that is formed in the shape of a hollow box and a base member 110 that is provided inside the cover member 104. The camera body 102 is provided with an LCD monitor and a plurality of buttons and dials (not shown). The outer shape of a main portion of the camera body 102 is a rectangular shape in a case where the camera body 102 is viewed in the direction of an optical axis of light from a subject (not shown).

In the following description, the longitudinal direction of the camera body 102 will be referred to as an X direction and the lateral direction of the camera body 102 will be referred to as a Y direction. In addition, the direction of the optical axis of light will be referred to as a Z direction. The X direction, the Y direction, and the Z direction are orthogonal to each other. Further, a state where the camera body 102 is disposed so that the X direction is along a horizontal direction is referred to as the horizontal attitude state of the digital camera 100. A state where the camera body 102 is disposed so that the X direction is along a vertical direction orthogonal to the horizontal direction is referred to as the vertical attitude state of the digital camera 100. The Y direction is an example of a movement direction which is orthogonal to the optical axis K (see FIG. 20) and in which a shutter member 144 (see FIG. 21) to be described later is moved. The X direction is an example of an orthogonal direction that is orthogonal to the movement direction.

<Cover Member>

For example, a cover member 104 is divided into two pieces in the Z direction with a dividing line (not shown) as a boundary. Specifically, the cover member 104 includes a front cover 105 that faces a subject (not shown) side in the Z direction and a rear cover 106 (see FIG. 20) that faces the imager 20 side in the Z direction. In the following description, a subject side will be referred to a front side and an imager 20 side will be referred to as a rear side in the Z direction.

A through-hole 105A, which penetrates the front cover 105 in the Z direction and through which light is to be incident, is formed in a part of the front cover 105. The size of the through-hole 105A is set to a size that does not affect the incidence of light from a subject. For example, two fastening target portions 108 are formed on a part of the back surface 105B of the front cover 105 facing the rear side.

Figure 19:
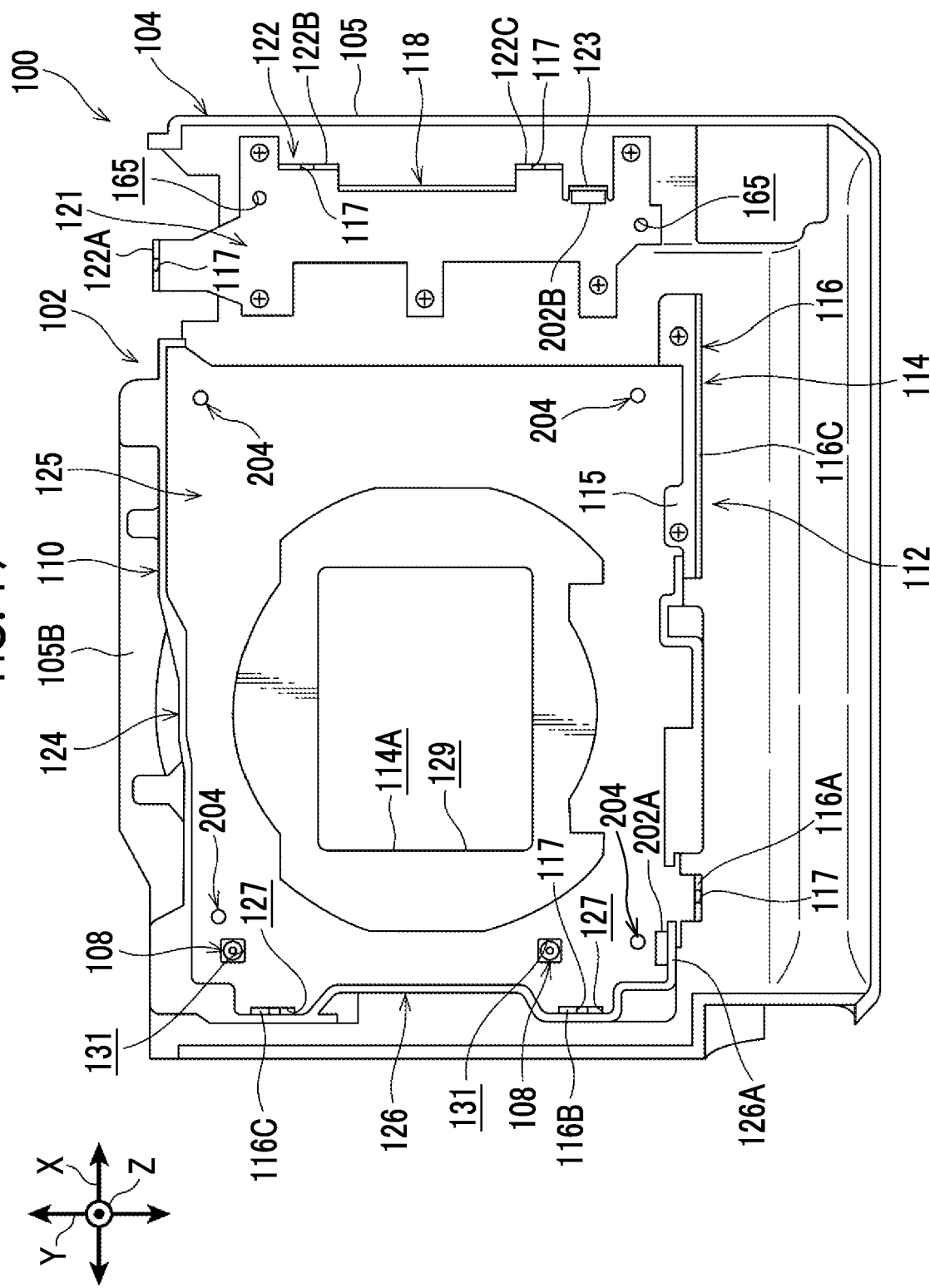
FIG. 19 is a diagram illustrating showing an example of a front part of the camera body of the digital camera according to the fifth embodiment.

The two fastening target portions 108 shown in FIG. 19 are disposed at intervals in the Y direction on the left side of the middle of the front cover 105 in the X direction in a case where the front side is viewed from the rear side in the Z direction. Further, the two fastening target portions 108 protrude rearward from the front cover 105 in the Z direction. The fastening target portion 108 is formed in the shape of a cylinder of which the axial direction is parallel to the Z direction. A female thread to which the male threaded portion of the shoulder screw 208 (see FIG. 21) is to be fastened is formed on the inner wall of each fastening target portion 108.

<Base Member>

The base member 110 includes, for example, a frame member 112 and a body member 124.

The frame member 112 includes, for example, a main frame 114 made of metal and a sub-frame 118. The main frame 114 overlaps the middle portion and the left portion of the front cover 105 in the X direction in a case where the front side is viewed from the rear side in the Z direction. The sub-frame 118 overlaps the right portion of the front cover 105 in the X direction in a case where the front side is viewed from the rear side in the Z direction.

The main frame 114 includes a flat portion 115 that is formed along the X-Y plane, and a plurality of standing plate portions 116 that stand upright from a part of the outer edge portion of the flat portion 115 rearward in the Z direction. In a case where the front side is viewed from the rear side in the Z direction, the plurality of standing plate portions 116 include a standing plate portion 116A which is disposed on the lower left side of the flat portion 115 and of which the plate thickness direction is parallel to the Y direction, a standing plate portion 116B that is disposed on the lower left side of the flat portion 115 and of which the plate thickness direction is parallel to the X direction, and other standing plate portions 116C.

The plurality of standing plate portions 116 are formed in a quadrangular shape in a case where the plurality of standing plate portions 116 are viewed in the plate thickness direction. A notch portion 117, which is recessed from the rear end of each standing plate portion forward in the Z direction, is formed at each standing plate portion 116. In a case where the notch portion 117 is viewed in the X direction, the notch portion 117 includes, for example, a linear portion 117A (see FIG. 18) that extends in the Z direction and a widened portion 117B (see FIG. 18) that is formed at the front portion of the linear portion 117A so as to have a width larger than the width of the linear portion 117A in the Y direction.

Further, the main frame 114 is fastened to the front cover 105 using a plurality of screws (not shown) in a state where the main frame 114 overlaps the back surface 105B from the rear side. A through-hole 114A, which penetrates the main frame 114 in the Z direction and through which light is to be incident, is formed in a part of the main frame 114. The size of the through-hole 114A is set to a size that does not affect the incidence of light from a subject.

The sub-frame 118 is fastened to the front cover 105 using a plurality of screws (not shown) in a state where the sub-frame 118 overlaps the back surface 105B from the rear side. Further, the sub-frame 118 includes a flat portion 121 that is formed along the X-Y plane and is long in the Y direction, three standing plate portions 122 that stand upright from a part of the outer edge portion of the flat portion 121 rearward in the Z direction, and one standing plate portion 123. Fastening holes 165 to which the shoulder screws 208 to be described later are to be fastened are formed at the flat portion 121. The three standing plate portions 122 are formed in, for example, a quadrangular shape in a case where the three standing plate portions 122 are viewed in the plate thickness direction. The three standing plate portions 122 are distinguished as a standing plate portion 122A, a standing plate portion 122B, and a standing plate portion 122C.

The standing plate portion 122A is disposed at the upper end of the flat portion 121 so that the plate thickness direction of the standing plate portion 122A is parallel to the Y direction in a case where the front side is viewed from the rear side in the Z direction. The standing plate portion 122B is disposed on the upper right side of the flat portion 121 so that the plate thickness direction of the standing plate portion 122B is parallel to the X direction. The standing plate portion 122C is disposed on the lower right side of the flat portion 121 so that the plate thickness direction of the standing plate portion 122C is parallel to the X direction. A notch portion 117, which is recessed from the rear end of each standing plate portion forward in the Z direction, is formed at each of the standing plate portions 122A, 122B, and 122C. The standing plate portion 123 is disposed below the standing plate portion 122C in the Y direction.

The body member 124 is a member that is disposed on the rear side of the main frame 114. Further, the body member 124 is made of, for example, a resin. Furthermore, the body member 124 includes a flat portion 125 that is formed along the X-Y plane and is long in the X direction, and a vertical wall portion 126 that stands upright from the outer edge portion of the flat portion 125 rearward in the Z direction. A portion of the vertical wall portion 126, which is disposed on the lower left side of the flat portion 125 so that the thickness direction of the portion of the vertical wall portion 126 is parallel to the Y direction, is referred to as a vertical wall portion 126A.

Two through-holes 127, which are disposed at intervals in the Y direction and penetrate the flat portion 125 in the Z direction, are formed at the left end portion of the flat portion 125. The standing plate portion 116B and the standing plate portions 116C protrude from the flat portion 125 rearward in the Z direction through the through-holes 127. Further, two through-holes 131, which are disposed at intervals in the Y direction and penetrate the flat portion 125 in the Z direction, are formed on the right side of the two through-holes 127. The two fastening target portions 108 protrude from the flat portion 125 rearward through the through-holes 131.

The body member 124 is fastened to the front cover 105 using a plurality of screws (not shown) in a state where the body member 124 overlaps the main frame 114 from the rear side. A through-hole 129, which penetrates the body member 124 in the Z direction and through which light is to be incident, is formed in a part of the body member 124. The size of the through-hole 129 is set to a size that does not affect the incidence of light from a subject.

Figure 20:
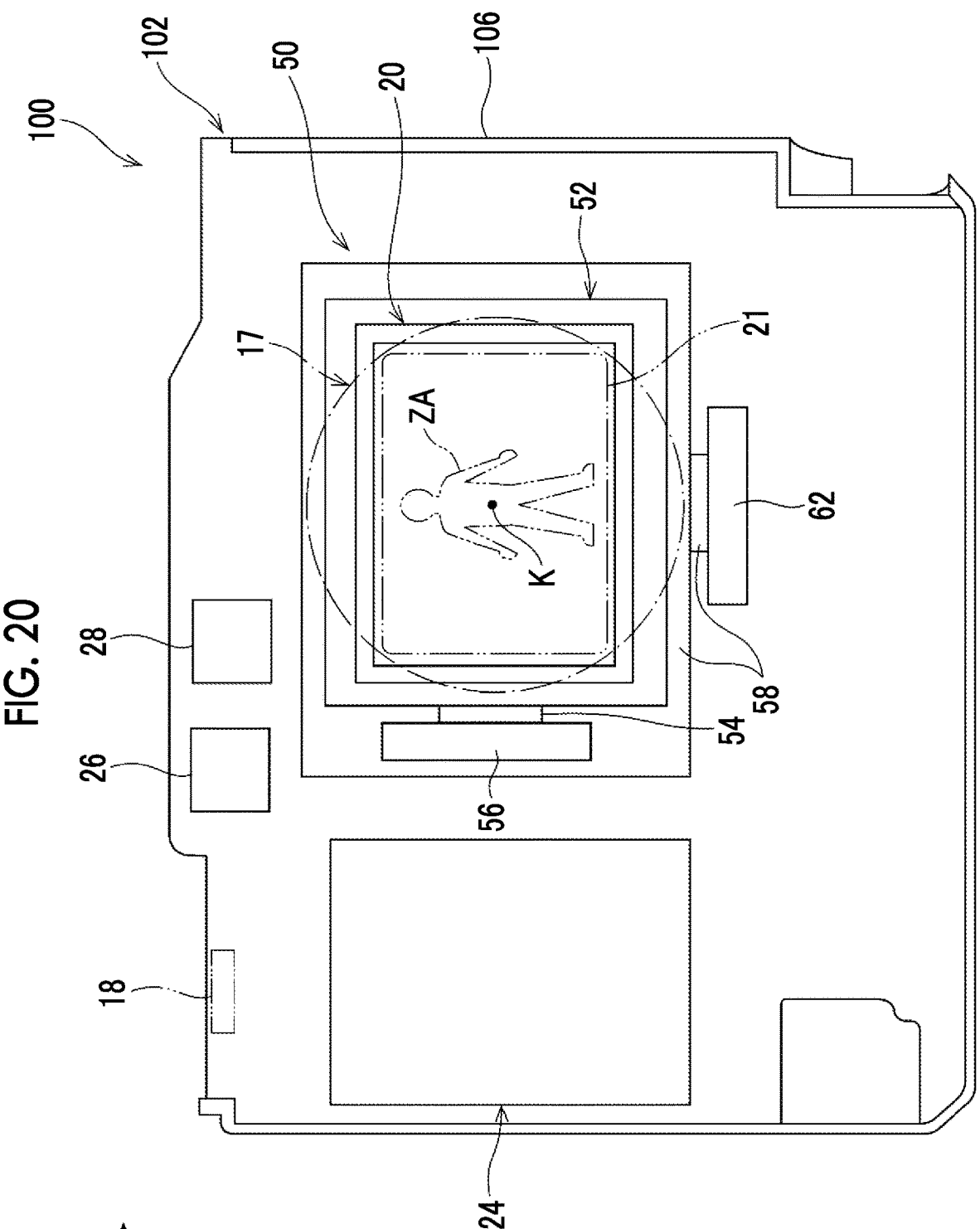
FIG. 20 is a diagram illustrating an example of the camera body, an imager, and the like of the digital camera according to the fifth embodiment.

FIG. 20 schematically shows an example of a state where the inside (rear cover 106 side) of the digital camera 100 is viewed from the front side in the Z direction. A shutter button 18 is provided on one side of the middle of the camera body 102 in the X direction and on the upper side of the middle thereof in the Y direction. Further, an imager 20, a controller 24 controlling the operation of each part of the digital camera 100, an acceleration sensor 26, an angular velocity sensor 28, and a correction unit 50 are provided in the camera body 102. The imaging lens unit 17 is integrally assembled with the camera body 102.

<Shutter>

Figure 21:
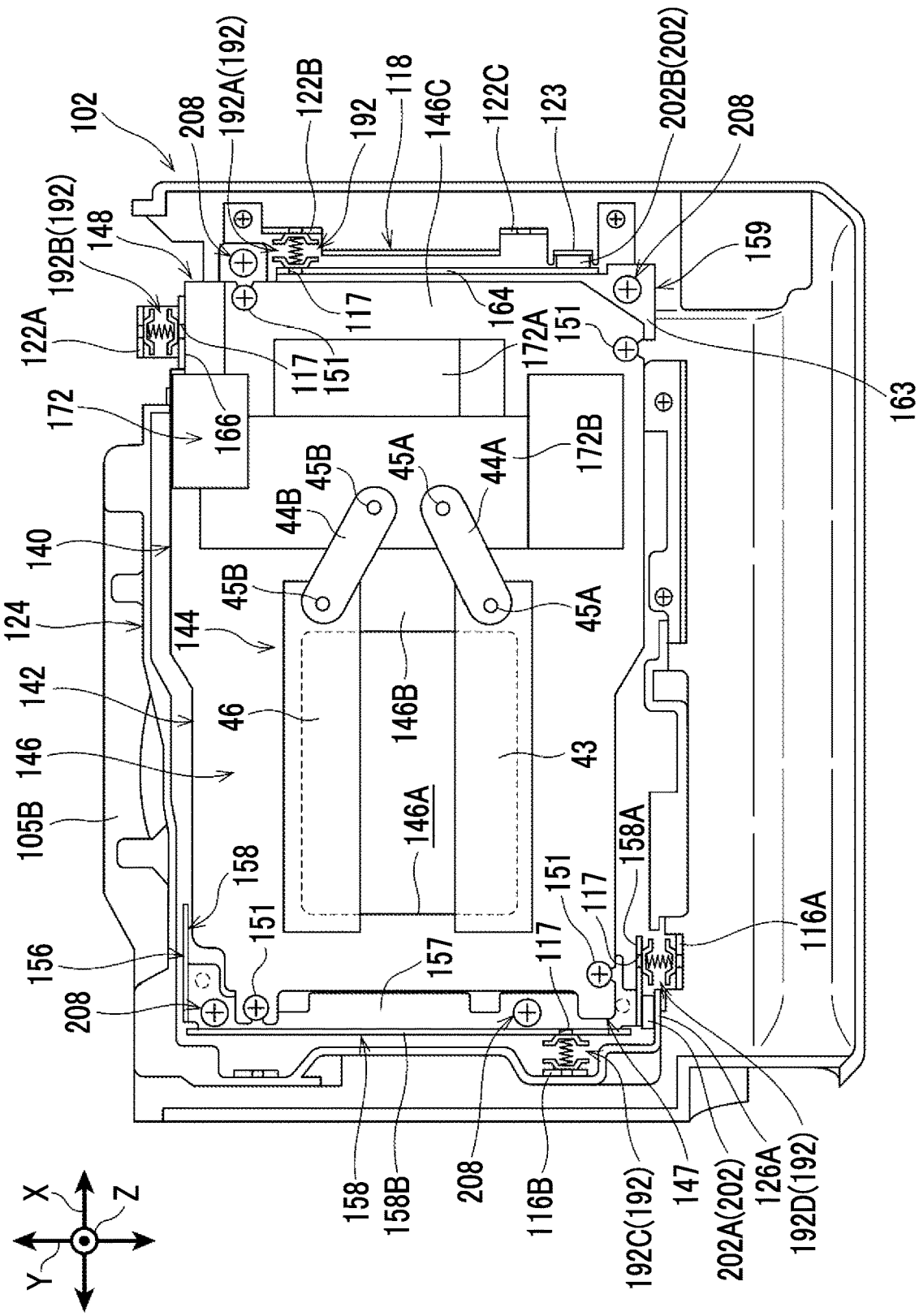
FIG. 21 is a diagram illustrating an example of the camera body and the shutter of the digital camera according to the fifth embodiment.

The shutter 140 shown in FIG. 21 is provided in the camera body 102. Specifically, the shutter 140 is formed of a focal-plane shutter. Further, the shutter 140 is disposed between the imaging lens unit 17 (see FIG. 20) and the imager 20 (see FIG. 20) in the Z direction, and has a function to adjust the amount of light to be incident on the imager 20. The shutter 140 includes a frame member 142 as an example of a support member and the shutter member 144.

<Frame Member>

The frame member 142 includes, for example, a body part 146 that forms a main portion of the frame member 142, a left bracket part 156 that is fixed to the left end portion of the body part 146, and a right bracket part 159 that is fixed to the right end portion of the body part 146. Further, the frame member 142 is housed in the camera body 102.

The body part 146 is formed in the shape of a box of which the thickness direction is parallel to the Z direction. Further, the body part 146 spreads along the X-Y plane. Furthermore, the body part 146 is formed in the shape of, for example, a polygon that includes a plurality of corners including a corner 147 provided on the lower left side and a corner 148 provided on the upper right side in a case where the front side is viewed from the rear side in the Z direction. In addition, in a case where the body part 146 is viewed in the Z direction, the body part 146 includes, for example, an opening portion 146A that penetrates the body part 146 in the Z direction, a peripheral edge portion 146B that surrounds the opening portion 146A, and a mounting target portion 146C on which a drive unit 172 is to be mounted. Guide portions (not shown) that guide a front curtain member 43 and a rear curtain member 46 in the Y direction are formed at the peripheral edge portion 146B.

The left bracket part 156 includes, for example, a flat plate-like fixing portion 157 that is formed along the X-Y plane and standing wall portions 158 that rise rearward in the Z direction at the peripheral edge of the fixing portion 157. The fixing portion 157 is fixed to the body part 146 using screws 151 in a state where the fixing portion 157 overlaps the body part 146 from the front side in the Z direction. Further, two through-holes 162 (see FIG. 23B), which penetrate the fixing portion 157 (frame member 142) in the Z direction, are formed at the fixing portion 157.

Figure 23A:
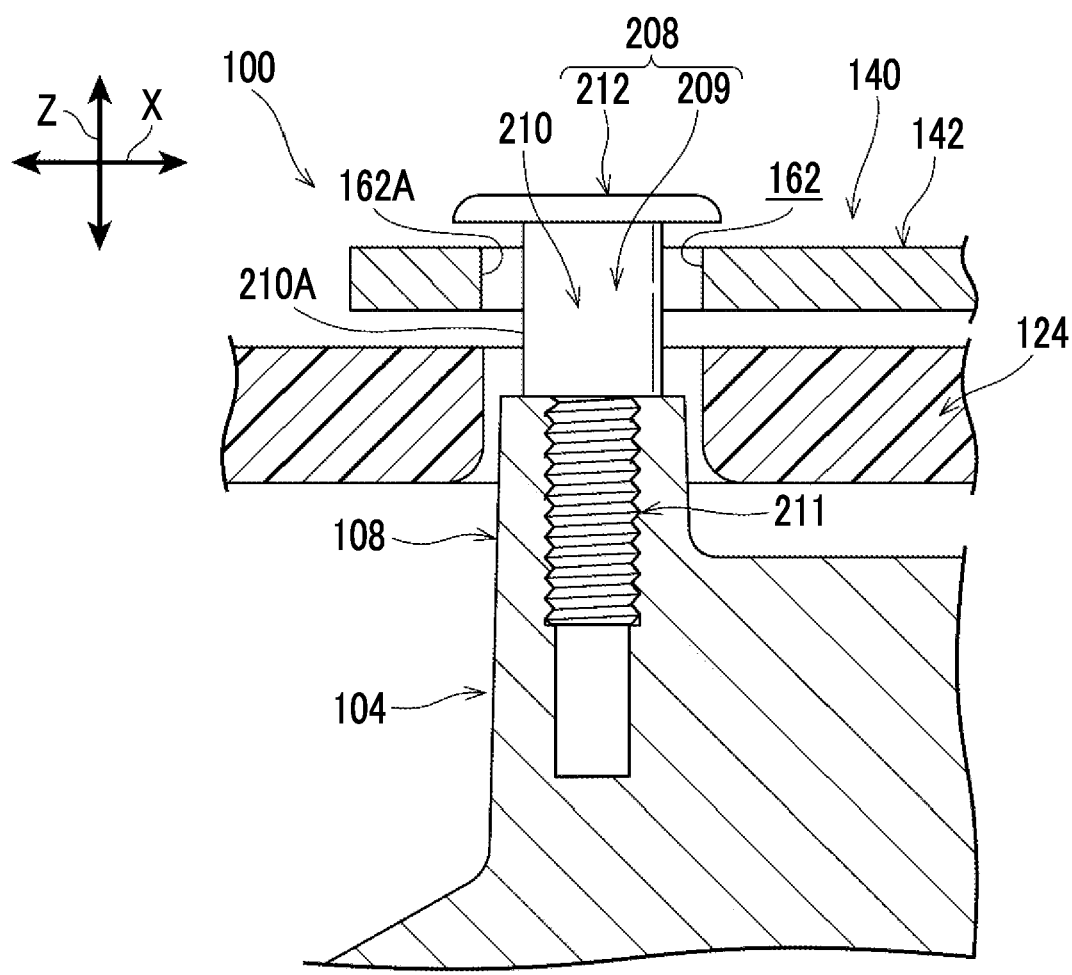
FIG. 23A is a partially enlarged cross-sectional view showing an example of a part of the camera body and a part of the shutter of the digital camera according to the fifth embodiment.
Figure 23B:
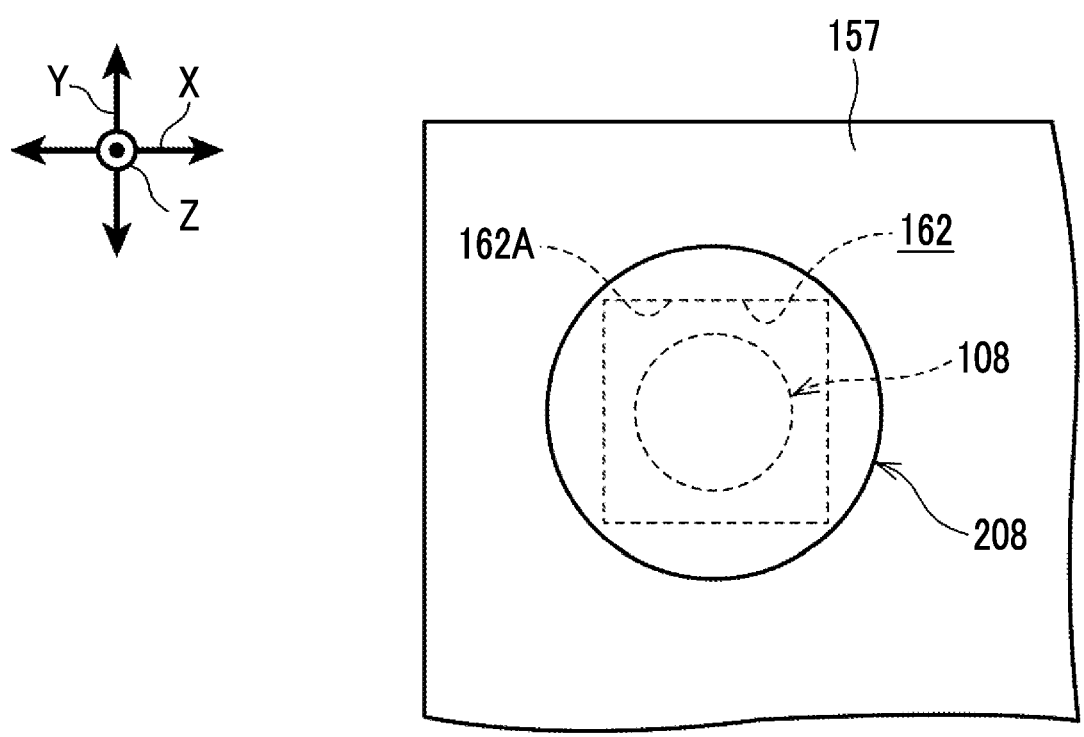
FIG. 23B is a diagram illustrating an example of a shoulder screw and a part of the shutter of the digital camera according to the fifth embodiment.

The through-hole 162 shown in FIG. 23B is formed in, for example, a quadrangular shape in a case where the through-hole 162 is viewed in the Z direction. The size of the through-hole 162 is larger than a size corresponding to the outer diameter of the fastening target portion 108. An interval between the two through-holes 162 in the Y direction is substantially equal to the interval between the two fastening target portions 108 in the Y direction. A portion forming the wall of the through-hole 162 is referred to as a hole wall 162A.

The standing wall portions 158 shown in FIG. 21 include a standing wall portion 158A which is disposed at the lower end of the fixing portion 157 so that the thickness direction of the standing wall portion 158A is parallel to the Y direction, and a standing wall portion 158B which is disposed at the left end of the fixing portion 157 so that the thickness direction of the standing wall portion 158B is parallel to the X direction. A notch portion 117 is formed at each of the standing wall portion 158A and the standing wall portion 158B. The right portion of the standing wall portion 158A is disposed so as to face the standing plate portion 116A in the Y direction in a state where the frame member 142 is assembled with the camera body 102. The left portion of the standing wall portion 158A is disposed so as to face the vertical wall portion 126A in the Y direction. The standing wall portion 158B is disposed so as to face the standing plate portion 116B in the X direction.

The right bracket part 159 includes, for example, a flat plate-like fixing portion 163 that is formed along the X-Y plane, and a standing wall portion 164 and a standing wall portion 166 that rise rearward in the Z direction at the peripheral edge of the fixing portion 163. The fixing portion 163 is fixed to the body part 146 using screws 151 in a state where the fixing portion 163 overlaps the body part 146 from the front side in the Z direction. Further, two through-holes 162 (see FIG. 23B), which penetrate the fixing portion 163 in the Z direction, are formed at the fixing portion 163 at intervals in the Y direction. The shaft portions of the shoulder screws 208 are inserted into the through-holes 162. Further, the shoulder screws 208 are fastened to the fastening holes 165 (see FIG. 19) of the sub-frame 118. The shutter 140 can be moved relative to the shoulder screws 208 (rotated about a center GA of gravity to be described later).

The standing wall portion 164 is disposed at the right end of the fixing portion 163 so that the thickness direction of the standing wall portion 164 is parallel to the X direction. A notch portion 117 is formed at the upper end portion of the standing wall portion 164. The standing wall portion 166 is disposed at the upper end of the fixing portion 163 so that the thickness direction of the standing wall portion 166 is parallel to the Y direction. A notch portion 117 is formed at the standing wall portion 166. The upper portion of the standing wall portion 164 is disposed so as to face the standing plate portion 122B in the X direction in a state where the frame member 142 is assembled with the camera body 102. The lower portion of the standing wall portion 164 is disposed so as to face the standing plate portion 123 in the X direction. The standing wall portion 166 is disposed so as to face the standing plate portion 122A in the Y direction.

<Shutter Member>

The shutter member 144 is supported by the body part 146. Further, the shutter member 144 includes, for example, a front curtain member 43, a link member 44A, connecting pins 45A, a rear curtain member 46, a link member 44B, and connecting pins 45B. In this embodiment, a drive unit 172 driving the front curtain member 43 and the rear curtain member 46 is included in the shutter member 144. The link members 44A and 44B come into contact with protrusion portions (not shown) provided on the frame member 142, so that the movement ranges of the link members 44A and 44B are limited. In other words, there is a possibility that an impact force caused by the contact between the link member 44A or 44B and the protrusion portion may be transmitted to the camera body 102 from the shutter 140 in a case where the shutter member 144 is moved downward or upward in the Y direction.

The drive unit 172 includes a motor 172A that is rotationally driven by the application of current from a power source unit (not shown) and a drive transmission unit 172B that includes a plurality of gears (not shown). The drive transmission unit 172B transmits the rotational drive of the motor 172A to the link members 44A and 44B. For example, the drive unit 172 is adapted to move the front curtain member 43 and the rear curtain member 46 upward in the Y direction and then to move the front curtain member 43 downward in the Y direction and to move the rear curtain member 46 downward in the Y direction in a case where the shutter button 18 (see FIG. 20) is pressed. A slit interval in the Y direction between the front curtain member 43 and the rear curtain member 46 to be moved in the Y direction is changed in the shutter 140, so that the exposure time of the digital camera 100 is adjusted.

The length of the front curtain member 43 in the X direction is set to be equal to or longer than the length of the opening portion 146A in the X direction. The length of the rear curtain member 46 in the X direction is set to be equal to or longer than the length of the opening portion 146A in the X direction. The front curtain member 43 and the rear curtain member 46 are guided by guide portions (not shown), so that the front curtain member 43 and the rear curtain member 46 are adapted to be movable in the Y direction.

<Center of Gravity of Shutter>

Figure 25:
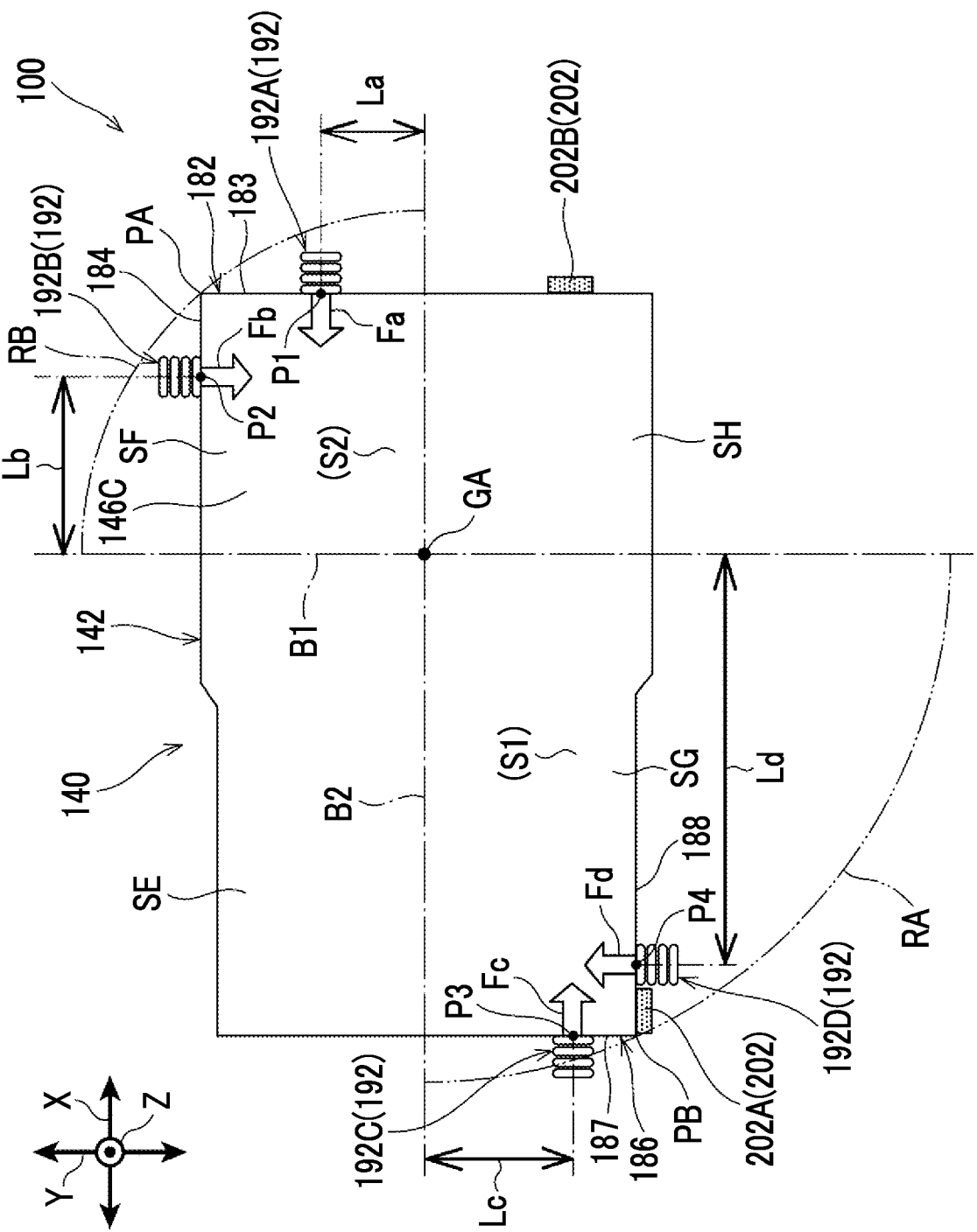
FIG. 25 is a diagram illustrating an example of a state where a plurality of coil springs and rubber members according to the fifth embodiment are disposed.

An example of the outer shape of the frame member 142 in a case where the frame member 142 is viewed in the Z direction (from the rear side) is shown in FIG. 25 in a simplified state. The opening portion 146A (see FIG. 21) is not shown. The shutter 140 has a center GA of gravity. The center GA of gravity is a point of application of a resultant force of gravitational forces that act on the respective portions of the shutter 140. The center GA of gravity is obtained as, for example, an intersection point between the line of action of the tension of a thread in a case where one point of the shutter 140 is suspended with the thread and is stopped and the line of action of the tension of a thread in a case where another point of the shutter 140 is suspended with the thread and is stopped. For example, the center GA of gravity will be described in this embodiment as being positioned on the mounting target portion 146C in a case where the shutter 140 is viewed in the Z direction.

An imaginary straight line, which passes through the center GA of gravity of the shutter 140 and extends in the Y direction in a case where the digital camera 100 is viewed in the Z direction in the horizontal attitude state of the digital camera 100, is referred to as a first imaginary straight line B1. Further, an imaginary straight line, which passes through the center GA of gravity and extends in the X direction, is referred to as a second imaginary straight line B2. In other words, imaginary straight lines passing through the center GA of gravity include the first imaginary straight line B1 and the second imaginary straight line B2. The first imaginary straight line B1 and the second imaginary straight line B2 are orthogonal to the Z direction that is the direction of an optical axis (the optical axis K (see FIG. 20)).

Four imaginary regions, which are divided in the digital camera 100 by the first imaginary straight line B1 and the second imaginary straight line B2 in a case where the front side is viewed from the rear side in the Z direction, are denoted by SE, SF, SG, and SH. The imaginary region SE is a region that is positioned on the upper left side of the center GA of gravity. The imaginary region SF is a region that is positioned on the upper right side of the center GA of gravity. The imaginary region SG is a region that is positioned on the lower left side of the center GA of gravity. The imaginary region SH is a region that is positioned on the lower right side of the center GA of gravity.

A portion of the frame member 142, which is positioned in the imaginary region SF and includes a vertex PA, is referred to as a first corner 182. Further, a portion of the frame member 142, which is positioned in the imaginary region SG and includes a vertex PB, is referred to as a second corner 186. The first and second corners 182 and 186 are an example of a set of corners that are the opposite corners of the frame member 142. Further, the first and second corners 182 and 186 face each other in the X-Y plane in an oblique direction that crosses the X direction and the Y direction.

The first corner 182 is a portion that is formed in a case where a side surface 183 corresponding to the right surface of the standing wall portion 164 (see FIG. 21) and a side surface 184 corresponding to the upper surface of the standing wall portion 166 (see FIG. 21) cross each other at the vertex PA in the imaginary region SF. In other words, the side surface 183 and the side surface 184 form the first corner 182. The side surface 183 is formed along, for example, the Y-Z plane. The side surface 184 is formed along, for example, the X-Z plane.

The second corner 186 is a portion that is formed in a case where a side surface 187 corresponding to the left surface of the standing wall portion 158B (see FIG. 21) and a side surface 188 corresponding to the lower surface of the standing wall portion 158A (see FIG. 21) cross each other at the vertex PB in the imaginary region SG. In other words, the side surface 187 and the side surface 188 form the second corner 186. The side surface 187 is formed along, for example, the Y-Z plane. The side surface 188 is formed along, for example, the X-Z plane.

<Spring Unit>

Figure 22:
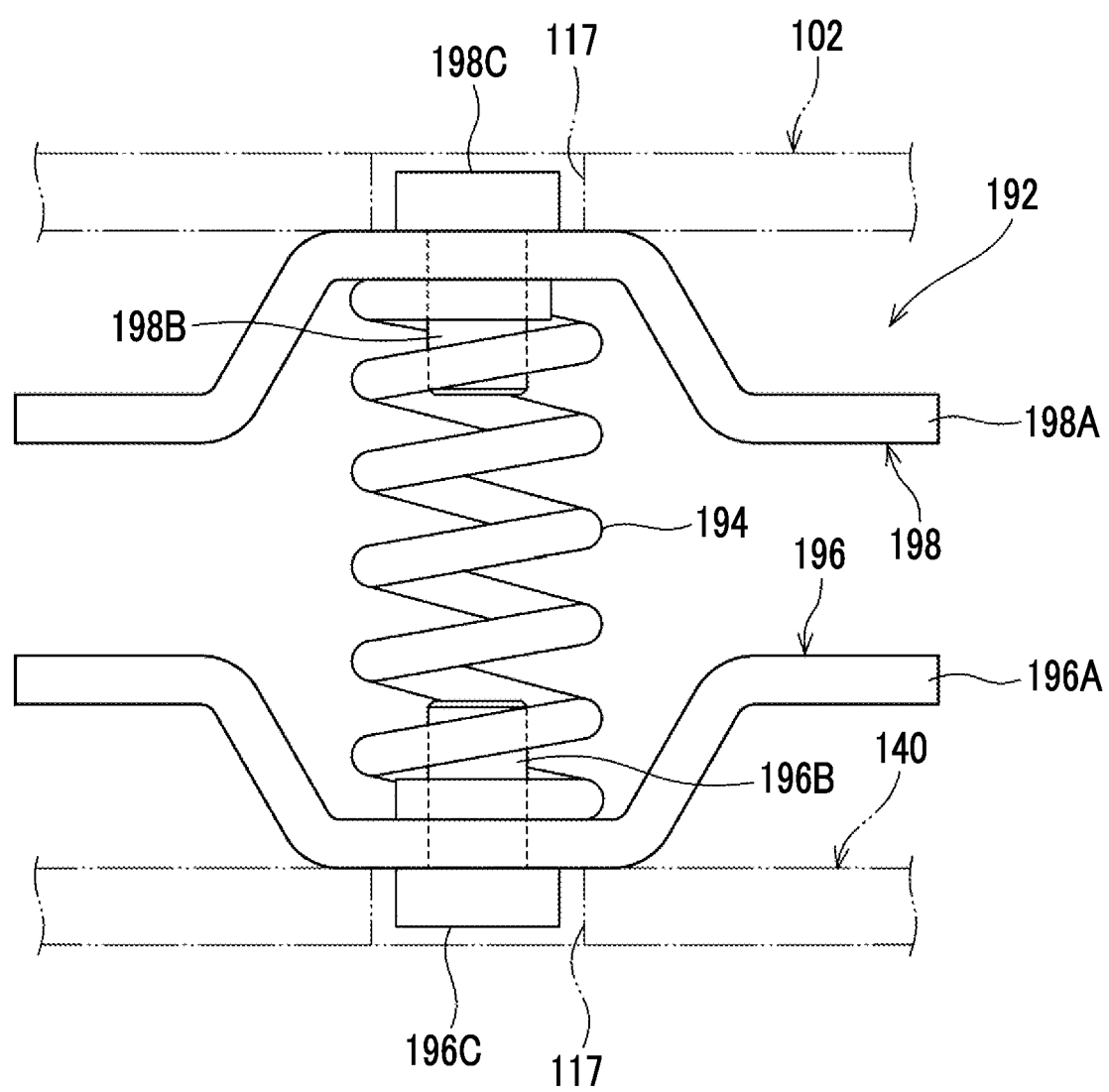
FIG. 22 is a diagram illustrating an example of a spring unit of the digital camera according to the fifth embodiment.

The spring unit 192 shown in FIG. 22 includes, for example, a coil spring 194, an inner mounting member 196 that is provided at one end of the coil spring 194 in an axial direction, and an outer mounting member 198 that is provided at the other end of the coil spring 194 in the axial direction.

The inner mounting member 196 is a part that is to be mounted on the shutter 140. Further, the inner mounting member 196 includes, for example, a sheet metal portion 196A, a protruding portion 196B, and a mounting portion 196C. The sheet metal portion 196A is disposed so that the thickness direction of the sheet metal portion 196A is parallel to the axial direction of the coil spring 194. The shape of the sheet metal portion 196A in a case where the sheet metal portion 196A is viewed in the thickness direction is, for example, a rectangular shape. A middle portion of the sheet metal portion 196A in a longitudinal direction is recessed toward one side in the thickness direction so as to have a trapezoidal shape in a case where the sheet metal portion 196A is viewed in a direction orthogonal to the thickness direction.

The protruding portion 196B is a portion that protrudes from the recessed portion of the sheet metal portion 196A in the thickness direction. The protruding portion 196B is formed in, for example, a columnar shape. The outer diameter of the protruding portion 196B in a case where the protruding portion 196B is viewed in the axial direction is smaller than the inner diameter of the coil spring 194 in a case where the coil spring 194 is viewed in the axial direction. The protruding portion 196B restricts the movement of the coil spring 194 in a direction orthogonal to the axial direction.

The mounting portion 196C is a portion that protrudes from the recessed portion of the sheet metal portion 196A toward a side opposite to the protruding portion 196B. Further, the mounting portion 196C is formed so as to be engageable with the already-described widened portion 117B (see FIG. 18).

The outer mounting member 198 is a part that is to be mounted on the camera body 102. Further, the outer mounting member 198 includes, for example, a sheet metal portion 198A, a protruding portion 198B, and a mounting portion 198C. The sheet metal portion 198A is disposed so that the thickness direction of the sheet metal portion 198A is parallel to the axial direction of the coil spring 194. The shape of the sheet metal portion 198A in a case where the sheet metal portion 198A is viewed in the thickness direction is, for example, a rectangular shape. A middle portion of the sheet metal portion 198A in a longitudinal direction is recessed toward one side in the thickness direction so as to have a trapezoidal shape in a case where the sheet metal portion 198A is viewed in a direction orthogonal to the thickness direction.

The protruding portion 198B is a portion that protrudes from the recessed portion of the sheet metal portion 198A in the thickness direction. The protruding portion 198B is formed in, for example, a columnar shape. The outer diameter of the protruding portion 198B in a case where the protruding portion 198B is viewed in the axial direction is smaller than the inner diameter of the coil spring 194 in a case where the coil spring 194 is viewed in the axial direction. The protruding portion 198B restricts the movement of the coil spring 194 in a direction orthogonal to the axial direction.

The mounting portion 198C is a portion that protrudes from the recessed portion of the sheet metal portion 198A toward a side opposite to the protruding portion 198B. Further, the mounting portion 198C is formed so as to be engageable with the already-described widened portion 117B (see FIG. 18).

One end of the coil spring 194 is caught in a groove (not shown) of the sheet metal portion 196A. The other end of the coil spring 194 is caught in a groove (not shown) of the sheet metal portion 198A. The coil spring 194, the inner mounting member 196, and the outer mounting member 198 of the spring unit 192 are integrally mounted on the camera body 102 and the shutter 140.

The four spring units 192 shown in FIG. 21 are distinguished as spring units 192A, 192B, 192C, and 192D. In a case where the four spring units 192 are not distinguished from each other, the four spring units 192 are simply referred to as spring units 192. Since the spring unit 192A is sandwiched between the standing plate portion 122B and the standing wall portion 164 in the X direction, the spring unit 192A causes a leftward elastic force in the X direction to act on the shutter 140. The spring unit 192B is sandwiched between the standing plate portion 122A and the standing wall portion 166 in the Y direction and causes a downward elastic force in the Y direction to act on the shutter 140.

Since the spring unit 192C is sandwiched between the standing plate portion 116B and the standing wall portion 158B in the X direction, the spring unit 192C causes a rightward elastic force in the X direction to act on the shutter 140. The spring unit 192D is sandwiched between the standing plate portion 116A and the standing wall portion 158A in the Y direction and causes an upward elastic force in the Y direction to act on the shutter 140.

The four spring units 192 and the two rubber members 202 are simplified and shown in FIG. 25 in addition to the frame member 142. The four spring units 192 are in contact with the first and second corners 182 and 186. The spring units 192A and 192B are in contact with the side surfaces 183 and 184 in directions different from each other (the X direction and the Y direction) in a case where the spring units 192A and 192B are viewed in the Z direction. The spring units 192C and 192D are in contact with the side surfaces 187 and 188 in directions different from each other (the X direction and the Y direction) in a case where the spring units 192C and 192D are viewed in the Z direction.

Specifically, the spring unit 192A is disposed on one side of the imaginary straight line B1 and on the upper side in the Y direction in a case where the spring unit 192A is viewed in the Z direction. The spring unit 192A is disposed in, for example, a compressed state and causes a load Fa [N] to act on the frame member 142 leftward in the X direction. An imaginary point where the central axis of the spring unit 192A and the frame member 142 cross each other is referred to as a point P1. A distance in the Y direction between the imaginary straight line B2 and the point P1 is referred to as a distance La [mm].

The spring unit 192B is disposed on one side of the imaginary straight line B1 and on the upper side in the Y direction in a case where the spring unit 192B is viewed in the Z direction. The spring unit 192B is disposed in, for example, a compressed state and causes a load Fb [N] to act on the frame member 142 downward in the Y direction. An imaginary point where the central axis of the spring unit 192B and the frame member 142 cross each other is referred to as a point P2. A distance in the X direction between the imaginary straight line B1 and the point P2 is referred to as a distance Lb [mm].

The spring unit 192C is disposed on the other side of the imaginary straight line B1 and on the lower side in the Y direction in a case where the spring unit 192C is viewed in the Z direction. The spring unit 192C is disposed in, for example, a compressed state and causes a load Fc [N] to act on the frame member 142 rightward in the X direction. An imaginary point where the central axis of the spring unit 192C and the frame member 142 cross each other is referred to as a point P3. A distance in the Y direction between the imaginary straight line B2 and the point P3 is referred to as a distance Lc [mm].

The spring unit 192D is disposed on the other side of the imaginary straight line B1 and on the lower side in the Y direction in a case where the spring unit 192D is viewed in the Z direction. The spring unit 192D is disposed in, for example, a compressed state and causes a load Fd [N] to act on the frame member 142 upward in the Y direction. An imaginary point where the central axis of the spring unit 192D and the frame member 142 cross each other is referred to as a point P4. A distance in the X direction between the imaginary straight line B1 and the point P4 is referred to as a distance Ld [mm].

In this embodiment, for example, the loads Fa, Fb, Fc, and Fd and the distances La, Lb, Lc, and Ld are set to satisfy a first relational expression (Fa×La=Fc×Lc) and to satisfy a second relational expression (Fb×Lb=Fd×Ld). The loads Fa, Fb, Fc, and Fd and the distances La, Lb, Lc, and Ld are set in a range where the rotational movement of the shutter 140 about the center GA of gravity in an allowable range is not restricted.

<Rubber Member>

The rubber members 202 shown in FIG. 21 are, for example, made of silicone rubber and are formed in the shape of a plate. For example, two rubber members 202 are used in the digital camera 100 and absorb impact acting on the shutter 140 in a case where the shutter member 144 is moved. The two rubber members 202 are distinguished as rubber members 202A and 202B. In a case where the two rubber members 202 are not distinguished from each other, the two rubber members 202 are simply referred to as rubber members 202.

The rubber member 202A is sandwiched between the standing wall portion 158A and the vertical wall portion 126A in the Y direction. The rubber member 202B is sandwiched between the standing wall portion 164 and the standing plate portion 123 in the Y direction. That is, the rubber members 202A and 202B are sandwiched between the camera body 102 and the frame member 142.

In FIG. 25, the rubber member 202A is disposed in a rotation region S1 of the second corner 186 about the center GA of gravity of the shutter 140. Specifically, an imaginary circle RA of which the radius is a segment connecting the center GA of gravity with the vertex PB is drawn. The imaginary circle RA is the locus of the movement of the vertex PB. Here, a region, which is surrounded by the imaginary circle RA, the first imaginary straight line B1, and the second imaginary straight line B2 and includes the vertex PB, is defined as the rotation region S1.

Here, a case where the rubber member 202A is disposed in the rotation region S1 includes not only a case where the entire rubber member 202A is disposed in the rotation region S1 but also a case where a part of the rubber member 202A is disposed in the rotation region S1. Further, a state where the rubber member 202A is disposed in the rotation region S1 means a state where the rubber member 202A is in contact with the frame member 142 in a case where the frame member 142 is rotated about the center GA of gravity. In other words, in a state where the frame member 142 and the rubber member 202A are not in contact with each other in a case where the frame member 142 is rotated, it is not said that the rubber member 202A is disposed in the rotation region S1.

For example, the rubber member 202B is in contact with the side surface 183 positioned in the imaginary region SH in this embodiment, but is merely disposed subsidiarily. Accordingly, the rubber member 202B may not be disposed on the side surface 183 positioned in the imaginary region SH. Further, the rubber member 202B may be disposed in a rotation region S2 of the first corner 182 about the center GA of gravity. Specifically, an imaginary circle RB of which the radius is a segment connecting the center GA of gravity with the vertex PA is drawn. The imaginary circle RB is the locus of the movement of the vertex PA. Here, a region, which is surrounded by the imaginary circle RB, the first imaginary straight line B1, and the second imaginary straight line B2 and includes the vertex PA, is defined as the rotation region S2. A state where the rubber member 202B is disposed in the rotation region S2 means a state where the rubber member 202B is in contact with the frame member 142 in a case where the frame member 142 is rotated about the center GA of gravity.

<Sponge Member>

Four sponge members 204 are mounted on the body member 124 shown in FIG. 19 so that the axial directions of the sponge members 204 are parallel to the Z direction. For example, the four sponge members 204 are disposed at the upper right portion, the lower right portion, the upper left portion, and the lower left portion of the body member 124, respectively.

Figure 24:
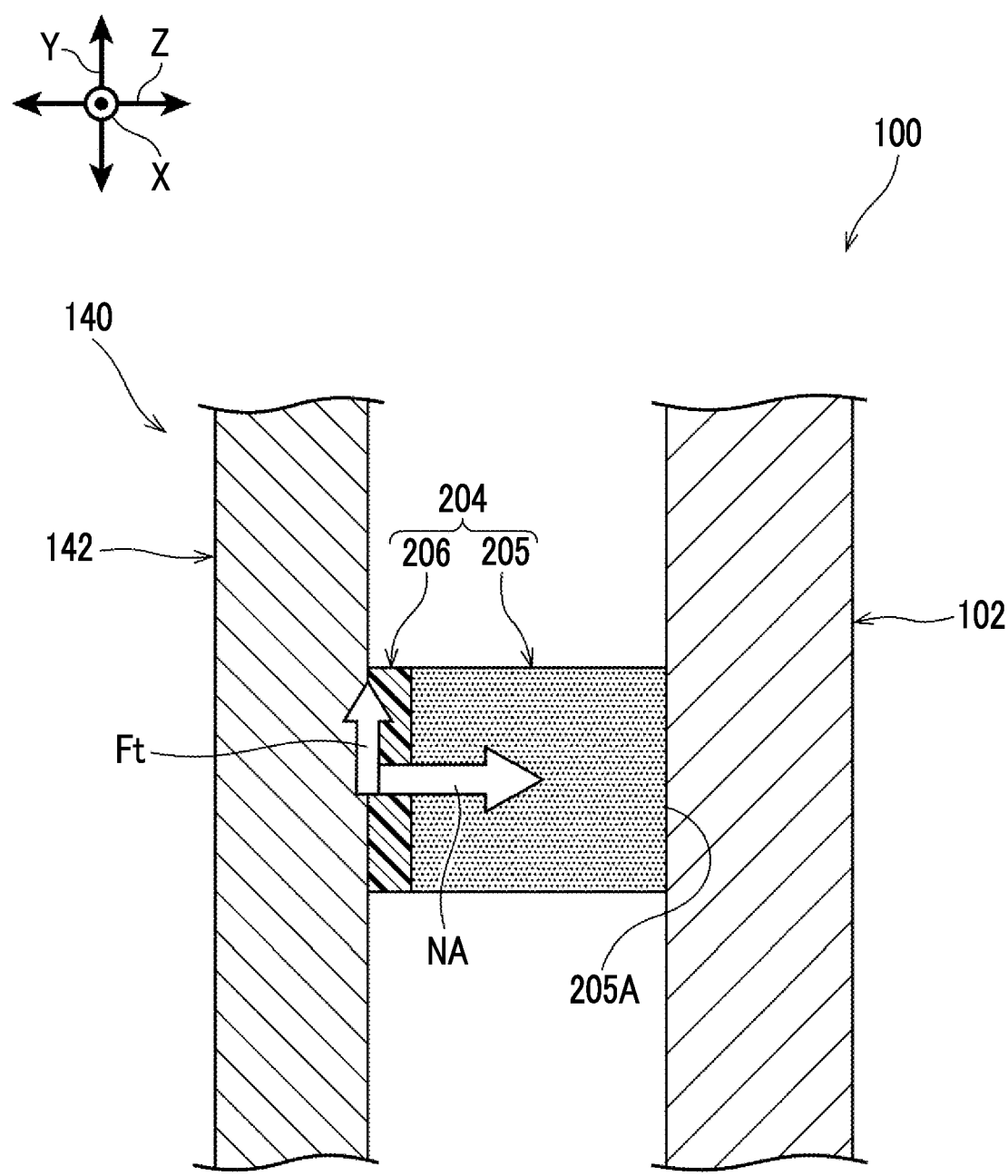
FIG. 24 is a diagram illustrating an example of a state where a sponge member according to the fifth embodiment causes a friction force to act on the frame member.

The sponge member 204 shown in FIG. 24 is, for example, a member that has a coefficient of friction lower than the coefficient of friction (coefficient of static friction) of the camera body 102 and the coefficient of friction (coefficient of static friction) of the frame member 142. Further, the sponge members 204 are sandwiched between the camera body 102 and the frame member 142 in the Z direction. Specifically, the sponge member 204 includes, for example, a columnar sponge body 205 of which the direction of a central axis is parallel to the Z direction, and a frictional sliding sheet 206 that is fixed to one end face of the sponge body 205 in the Z direction (the surface of the sponge body 205 facing the frame member 142).

An end face 205A of the sponge body 205 in the Z direction adheres to the body member 124. Further, the frictional sliding sheet 206 is in contact with the frame member 142 in the Z direction. A normal force NA [N] acts on the sponge body 205 and the frictional sliding sheet 206 in the Z direction. In a case where the coefficient of static friction of an interface between the frame member 142 and the frictional sliding sheet 206 is denoted by μa, a friction force Ft [N] at the initial stage of the movement of the frame member 142 satisfies Ft=μa×NA. The sponge member 204 is formed of a member that slides on the frame member 142 as the frame member 142 is moved.

<Shoulder Screw>

The shoulder screw 208 shown in FIG. 23A includes a shaft portion 209 and an overhanging portion 212. The directions of the respective portions of the shoulder screw 208 will be described using directions in a state where the shoulder screw 208 is fastened to the fastening target portion 108.

The shaft portion 209 is disposed so that the axial direction of the shaft portion 209 is parallel to the Z direction. Further, the shaft portion 209 includes, for example, a restriction object portion 210 and a threaded portion 211. The restriction object portion 210 is formed in the shape of a column of which the axial direction is parallel to the Z direction, and includes an outer peripheral surface 210A. The length of the restriction object portion 210 in the Z direction is set to a length that allows the rear end face of the restriction object portion 210 in the Z direction to be disposed on the rear side of (to protrude rearward from) the rear end face of the frame member 142 in the Z direction. A part of the outer peripheral surface 210A is disposed so as to face the hole wall 162A of the through-hole 162 with an interval between itself and the hole wall 162A in a radial direction.

The threaded portion 211 is formed in the shape of a column of which the axial direction is parallel to the Z direction. The central axis of the threaded portion 211 is coaxial with the central axis of the restriction object portion 210. Further, the threaded portion 211 extends forward from the front end face of the restriction object portion 210 in the Z direction. The outer diameter of the threaded portion 211 is smaller than the outer diameter of the restriction object portion 210. A male thread to be fastened to the female thread of the fastening target portion 108 is formed on the outer peripheral surface of the threaded portion 211. Further, the shaft portion 209 is inserted into the through-hole 162 and is fastened to the fastening target portion 108.

The overhanging portion 212 is a portion that overhangs from the end portion of the shaft portion 209, which is close to the frame member 142, in a direction orthogonal to the Z direction. Further, the overhanging portion 212 is formed in the shape of, for example, a disc of which the thickness direction is parallel to the Z direction. The size of the outer diameter of the overhanging portion 212 is set to a size that allows the overhanging portion 212 to cover the through-hole 162 in a case where the overhanging portion 212 is viewed in the Z direction. A gap is formed between the overhanging portion 212 and the frame member 142. Since the frame member 142 comes into contact with each overhanging portion 212, the overhanging portion 212 limits the movement range of the frame member 142 in the Z direction.

With regard to the suppression of the vibration of the digital camera 100 shown in FIG. 25, the spring units 192 are disposed on one side and the other side of the first imaginary straight line B1, which passes through the center GA of gravity of the shutter 140 and is orthogonal to the optical axis K, in the X direction in a case where the spring units 192 are viewed in the Z direction. Further, since the frame member 142 is supported by the camera body 102 (see FIG. 18) through the spring units 192, the vibration of the shutter 140 is suppressed.

[Action]

Next, the actions of the digital camera 100 and a vibration suppression method for the digital camera 100 according to the fifth embodiment will be described. Although a case where the attitude of the digital camera 100 is a horizontal attitude state will be described, the same action can be obtained even in a case where the attitude of the digital camera 100 is a vertical attitude state.

Since the four spring units 192 are in contact with the frame member 142 in the digital camera 100 shown in FIG. 21, the frame member 142 is supported. Accordingly, the frame member 142 does not need to be rigidly connected to the camera body 102. Since the frame member 142 is not rigidly connected to the camera body 102, the transmission of an impact force to the camera body 102 from the shutter 140 can be suppressed as compared to configuration where the frame member 142 is rigidly connected. In other words, since the digital camera 100 is adapted so that the movement of the frame member 142 is allowed in an allowable range by the four spring units 192, the transmission of an impact force to the camera body 102 from the shutter 140 can be suppressed.

In a case where the shutter button 18 (see FIG. 20) is operated, the shutter member 144 (the front curtain member 43 and the rear curtain member 46) is moved downward in the Y direction and then moved upward in the shutter 140. Since an impact force acts on the frame member 142 in a case where the shutter member 144 is moved in the Y direction, the frame member 142 may be rotated about the center GA of gravity (see FIG. 26). Here, the impact force acting on the frame member 142 is reduced by the loads (restoring forces) of the four spring units 192. That is, the transmission of the impact force to the camera body 102 from the shutter 140 can be suppressed.

The spring units 192 are disposed on one side and the other side of the imaginary straight line B1, which passes through the center GA of gravity, in the X direction in the digital camera 100 shown in FIG. 25. Since the spring units 192 are disposed on one side and the other side of the imaginary straight line B1, the rotation of the shutter 140 (frame member 142) about the center GA of gravity, which is biased in one direction, is suppressed. Since the biased rotation of the shutter 140 is suppressed, the contact between the shutter 140 and the camera body 102 is suppressed. Accordingly, the transmission of an impact force to the camera body 102 from the shutter 140 can be suppressed.

Since the transmission of the impact force to the camera body 102 from the shutter 140 is suppressed as described above in the digital camera 100, an impact force to be transmitted to the correction unit 50 (see FIG. 20) is reduced. Accordingly, the erroneous correction of the correction unit 50 can be suppressed.

Figure 26:
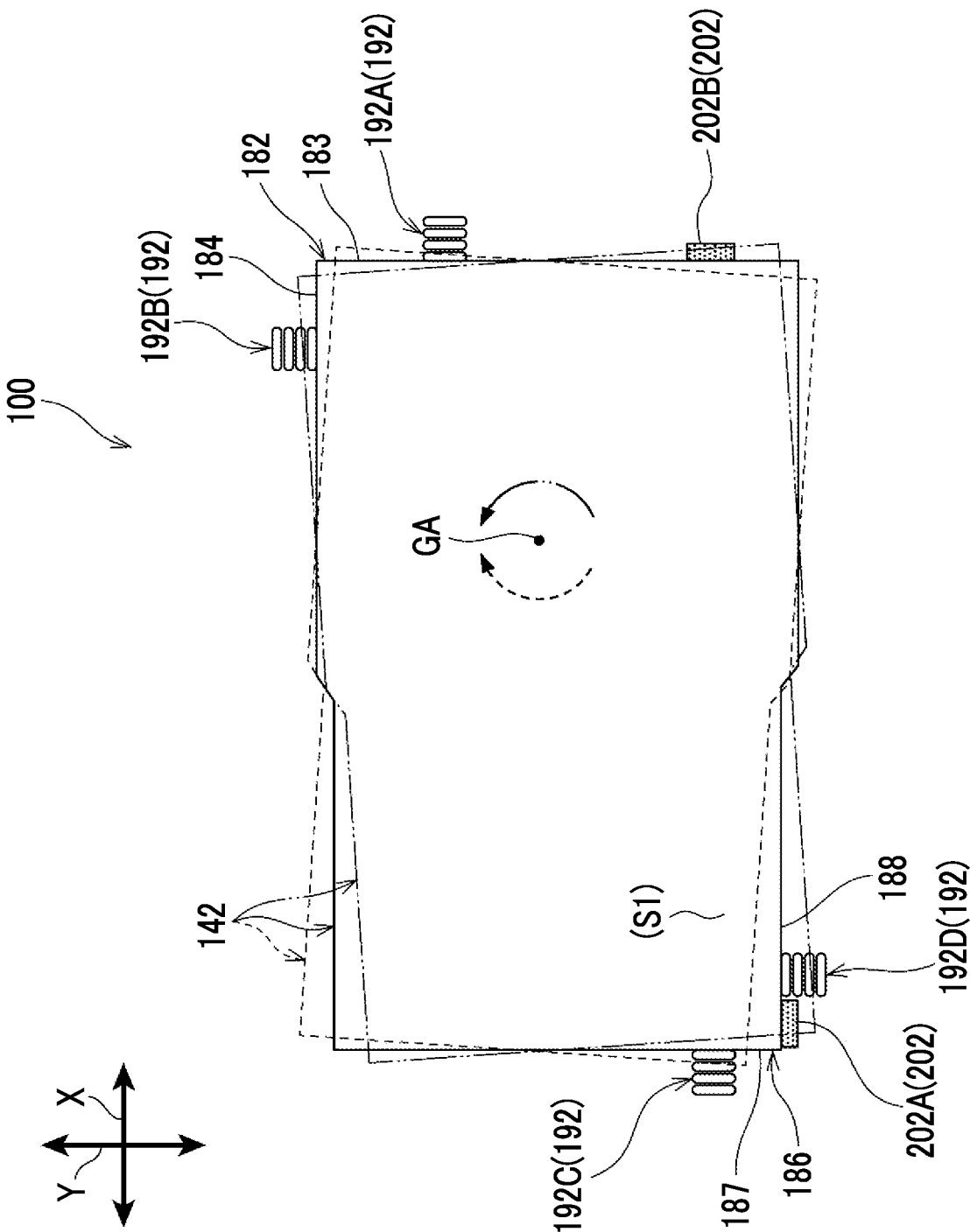
FIG. 26 is a diagram illustrating an example of a state where the entire shutter according to the fifth embodiment moves rotationally about the center of gravity.

The first and second corners 182 and 186, which are the opposite corners of the frame member 142, and the four spring units 192 are in contact with each other in the digital camera 100 shown in FIG. 26. In other words, the spring units 192 are not in contact with corners that are the other opposite corners of the frame member 142. That is, the frame member 142 is easily rotated about the center GA of gravity. The opening portion 146A (see FIG. 21) is not shown in FIG. 26.

Here, the rotation of the frame member 142 about the center GA of gravity in one direction, which is generated by an impact force caused by the downward movement of the shutter member 144 (see FIG. 21) in the Y direction, is limited by the contact between the frame member 142 and one spring unit 192 provided at each of the opposite corners. In addition, the rotation of the frame member 142 about the center GA of gravity in the other direction (reverse direction), which is generated by an impact force caused by the upward movement of the shutter member 144 in the Y direction, is limited by the contact between the frame member 142 and the other spring unit 192 provided at each of the opposite corners. That is, the vibration of the frame member 142 is damped by one spring unit 192 provided at each of the opposite corners and the other spring unit 192 provided at each of the opposite corners. Accordingly, the transmission of the impact force to the camera body 102 (see FIG. 21) from the shutter 140 can be suppressed.

In other words, the fact that the shutter 140 is easily rotated about the center GA of gravity means that the shutter 140 does not need to be forcibly translated in a case where the mass of the shutter 140 is large. That is, since the movement distance of the shutter 140 is ensured in a case where an impact force acting on the shutter 140 is to be damped by the loads (restoring forces) of the spring units 192 during the movement of the shutter 140, the impact force can be easily damped.

Further, in the digital camera 100, two spring units 192 are in contact with the side surfaces 183 and 184 in directions different from each other and the other two spring units 192 are in contact with the side surfaces 187 and 188 in directions different from each other. In other words, since not only the rotation of the shutter 140 in one direction but also the rotation of the shutter 140 in the reverse direction is suppressed by the spring units 192, the vibration of the shutter 140 can be suppressed.

Furthermore, in the digital camera 100, the rubber member 202 is disposed in the rotation region S1 of the second corner 186 about the center GA of gravity and is sandwiched between the camera body 102 (see FIG. 21) and the frame member 142. Since impact (impact force) is absorbed by the load (restoring force) of the rubber members 202 in a case where the frame member 142 and the rubber member 202 come into contact with each other due to the rotation of the shutter 140, the vibration of the shutter 140 can be suppressed as compared to configuration where the rubber member 202 is not provided.

In the digital camera 100 shown in FIG. 24, the sponge members 204 are sandwiched between the camera body 102 and the frame member 142 in the Z direction. Here, in a case where the vibration of the shutter 140 caused by the movement of the shutter member 144 (see FIG. 21) is generated, a friction force equal to or smaller than the friction force Ft acts on the frame member 142. Since the friction force acts on the frame member 142, the vibration of the frame member 142 is damped. That is, since the vibration of the shutter 140 is damped by the friction forces of the four sponge members 204, the transmission of an impact force to the camera body 102 from the shutter 140 is suppressed. Since the transmission of the impact force to the camera body 102 from the shutter 140 is suppressed, an impact force to be transmitted to the correction unit 50 (see FIG. 20) is reduced. Accordingly, the erroneous correction of the correction unit 50 can be suppressed.

The frame member 142 is disposed with a gap between itself and the camera body 102 in the Z direction so as to be rotatable. Here, even though an upper portion of the frame member 142 in the Y direction is inclined forward in the Z direction, the inclination of the shutter 140 toward one side (front side) in the Z direction can be suppressed since the sponge members 204 support the frame member 142 from the front side in the Z direction.

In a case where the shutter 140 is rotated about the center GA of gravity (see FIG. 25) at a large angle, the outer peripheral surfaces 210A come into contact with the hole walls 162A in the digital camera 100 shown in FIG. 23A. Since the outer peripheral surfaces 210A come into contact with the hole walls 162A, the rotation of the frame member 142 is restricted. That is, the excessive rotation of the frame member 142 can be restricted in the digital camera 100 using the shoulder screws 208.

Sixth Embodiment

Next, examples of an imaging device and a vibration suppression method for the imaging device according to a sixth embodiment will be described. The same components as those of the fifth embodiment will be denoted by the same reference numerals as those of the fifth embodiment and the description of the structures and actions thereof will be omitted.

Figure 27:
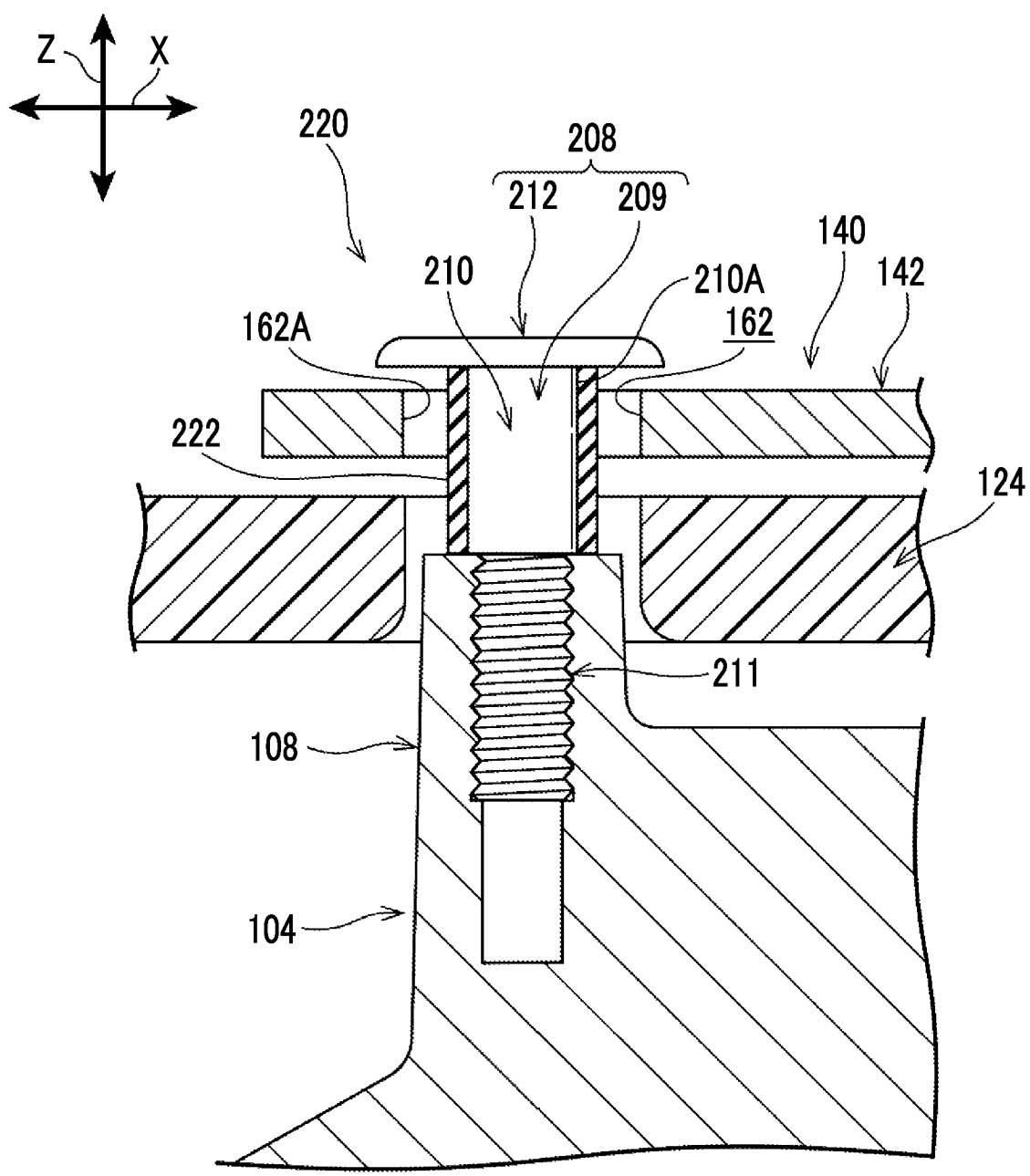
FIG. 27 is a partially enlarged cross-sectional view showing an example of a part of a camera body and a part of the shutter of a digital camera according to a modification example of a sixth embodiment.

FIG. 27 shows a digital camera 220 as an example of an imaging device according to a sixth embodiment. The digital camera 220 has configuration where covering members 222 as an example of contact members are added to the digital camera 100 (see FIG. 18) according to the fifth embodiment.

Each covering member 222 is made of, for example, silicone rubber and is formed in a cylindrical shape. Further, the covering member 222 covers the outer peripheral surface 210A. In other words, a portion of the outer peripheral surface 210A of the shaft portion 209 facing the hole wall 162A of the through-hole 162 is provided with the covering member 222. Further, the covering member 222 has elasticity and is disposed so as to be capable of coming into contact with the hole wall 162A.

[Action]

Next, the actions of the digital camera 220 and a vibration suppression method for the digital camera 220 according to the sixth embodiment will be described.

Since the covering member 222 of each shoulder screw 208 comes into contact with the hole wall 162A in the digital camera 220 in a case where the shutter 140 is rotated about the center GA of gravity (see FIG. 21) at a large angle, the rotation of the frame member 142 is restricted. Here, since the covering member 222 absorbs a load received due to the contact between the covering member 222 and the hole wall 162A by the restoring force of the covering member 222, an impact force, which is generated on the frame member 142 in a case where the excessive rotation of the frame member 142 is restricted, can be suppressed.

The disclosure is not limited to the above-mentioned embodiments.

In the digital camera 10, two coil springs 60 may not be disposed on the imaginary straight line A1. Further, the plurality of coil springs 60 may not be aligned with the frame member 32 in the Y direction. Furthermore, among the loads that are caused to act on the frame member 32 by the plurality of coil springs 60, the loads of which the distances from the imaginary straight line A1 are longer and the loads of which the distances from the imaginary straight line A1 are shorter may have the same magnitude. In addition, the distances L1 and L2 and the loads F1 and F2 may not satisfy the relational expression (F1×L1=F2×L2). Further, in the digital camera 10, the frame member 32 does not have a polygonal shape and may have a shape including a curved surface in a case where the frame member 32 is viewed in the Z direction. Furthermore, the frame member 32 may be aligned with the camera body 12 in the Z direction without being housed in the camera body 12. The above-mentioned configuration may be applied to even the digital cameras 70, 80, and 90.

In the digital camera 70, the distances LA and LB and the loads FA and FB may not satisfy the relational expression (FA×LA=FB×LB).

In the digital camera 80, the plurality of rubber members 84 may be in contact with only one of the side surfaces 35A and 35B forming each corner 35.

In the digital camera 90, a surface with which the sponge members 92 are in contact is not limited to the surface of the frame member 32 facing the imager 20 side and may be the surface of the frame member 32 facing a subject side or the outer peripheral surface of the frame member 32.

The elastic member is not limited to the coil spring 60 made of metal, and may be a member made of rubber or a resin and having elasticity. Further, the elastic member is not limited to a member that causes a load to act on the shutter 30 (frame member 32) in a direction where the shutter 30 is pressed, and may be a member that causes a tensile force to act on the shutter 30. For example, tension springs may be disposed on the upper side of the shutter 30 in the Y direction so as to suspend the shutter 30 (frame member 32) in the Y direction. The number of the coil springs 60 is not limited to six or ten, and may be any number of 2 or more.

The damping member is not limited to the rubber member 84, and may be a member made of a resin or a member having viscosity. Further, the damping member may be formed of a gel-like member. The material of the rubber member 84 is not limited to silicone rubber, and may be other rubber, such as urethane rubber. The number of the rubber members 84 is not limited to eight, and may be any number of 2 or more.

The friction member may be formed of only the sponge body 94 without the frictional sliding sheet 96. Further, the friction member may be formed of other members, such as urethane and/or rubber. The number of the sponge members 92 is not limited to four, and may be any number of 1 or 2 or more.

The first imaginary straight line A1 and the second imaginary straight line A2 are not limited to straight lines extending along the X direction and the Y direction, and may be straight lines extending in oblique directions crossing the X direction and the Y direction.

The plurality of spring units 192 may be in contact with only one of two side surfaces forming each corner in the digital cameras 100 and 220 in a case where the plurality of spring units 192 are viewed in the Z direction. The rubber member 202 may be in contact with the frame member 142 outside the rotation region S1 of the second corner 186. Further, the rubber member 202 is not limited to a member that is in contact with the frame member 142 before the rotation of the frame member 142. That is, the rubber member 202 may be a member that is not in contact with the frame member 142 before the rotation of the frame member 142 and is in contact with the frame member 142 in a case where the frame member 142 is rotated.

Furthermore, the sponge members 204 may not be sandwiched between the camera body 102 and the frame member 142 in the digital cameras 100 and 220. The shoulder screws 208 may not be provided and members, which limit the rotation range (restrict the movement) of the frame member 142 by coming into contact with the outer edge portion of the frame member 142, may be provided.

In addition, each spring unit 192 may be formed of only the coil spring 194 in the digital cameras 100 and 220. Portions with which the spring units 192 are to be in contact are not limited to the first and second corners 182 and 186 of the frame member 142, and may be the other set of corners that are opposite corners.

The elastic member is not limited to the spring unit 192 (coil spring 194) made of metal, and may be a member made of rubber or a resin and having elasticity. Further, the elastic member is not limited to a member that causes a load to act on the shutter 140 (frame member 142) in a direction where the shutter 140 is pressed, and may be a member that causes a tensile force to act on the shutter 140. For example, tension springs may be disposed on the upper side of the shutter 140 in the Y direction so as to suspend the shutter 140 (frame member 142) in the Y direction. The number of the spring units 192 may be 2 or more on each side surface.

The impact absorbing member is not limited to the rubber member 202 and may be a member made of a resin or a member having viscosity. Further, the impact absorbing member may be formed of a gel-like member. The material of the rubber member 202 is not limited to silicone rubber, and may be other rubber, such as urethane rubber. The number of the rubber members 202 disposed at the corner, which is an opposite corner, is not limited to one and may be plural.

The sponge member 204 may be formed of only the sponge body 205 without the frictional sliding sheet 206. Further, the sponge member 204 may be formed of other members, such as urethane and/or rubber. The number of the sponge members 204 is not limited to four, and may be any number of 1 or 2 or more.

Cylindrical portions of which the axial directions are parallel to the Z direction may be used as the fastening target portions 108, columnar pins may be used instead of the shoulder screws 208, and the pin may be press-fitted to each cylindrical portion so as to be mounted on the camera body 102. Further, the movement of the frame member 142 may be limited by the pins.

The description contents and shown contents having been described above are the detailed description of portions according to the technique of the disclosure, and are merely an example of the technique of the disclosure. For example, the description of the configuration, functions, actions, and effects having been described above is the description of examples of the configuration, functions, actions, and effects of the portions according to the technique of the disclosure. Accordingly, it goes without saying that unnecessary portions may be deleted or new elements may be added or replaced in the description contents and shown contents described above without departing from the scope of the technique of the disclosure. Further, common technical knowledge, which allows the technique of the disclosure to be embodied and does not need to be particularly described, is not described in the description contents and shown contents, which have been described above, in order to avoid complication and facilitate the understanding of portions according to the technique of the disclosure.

In this specification, "A and/or B" is synonymous with "at least one of A or B". That is, "A and/or B" means that only A may be used, only B may be used, or a combination of A and B may be used. Further, in this specification, the same concept as "A and/or B" is applied to even a case where three or more items are expressed so as to be connected using "and/or".

All documents, patent applications, and technical standards disclosed in this specification are incorporated in this specification by reference so that the incorporation of each of the documents, the patent applications, and the technical standards by reference is specific and is as detailed as that in a case where the documents, the patent applications, and the technical standards are described individually.

What is claimed is:

1. An imaging device comprising:
    an imager that is provided in a device body and includes an imaging surface orthogonal to an optical axis of light forming an optical image;
    a shutter that is provided in the device body, includes a support member and a shutter member supported by the support member and moving in a direction orthogonal to the optical axis, and adjusts an amount of light to be incident on the imager;
    an actuator that is provided in the device body and moves the imager in the direction orthogonal to the optical axis to correct an amount of camera shake; and
    a plurality of elastic members that are disposed on at least one side and the other side of an imaginary straight line passing through a center of gravity of the shutter and orthogonal to the optical axis in a case where the plurality of elastic members are viewed in a direction of the optical axis and are in contact with the device body and the support member,
    wherein the plurality of elastic members cause loads to act on the support member.

2. The imaging device according to claim 1, wherein a direction of expansion and contraction of the elastic members are in a plane perpendicular to the optical axis.

3. The imaging device according to claim 1, wherein two elastic members of the plurality of elastic members are disposed at intervals on the imaginary straight line.

4. The imaging device according to claim 1, wherein the plurality of elastic members are aligned with the support member in a movement direction of the shutter member.

5. The imaging device according to claim 1, wherein among loads that are caused to act on the support member by the plurality of elastic members, the loads of which distances from the imaginary straight line are longer are smaller than the loads of which distances from the imaginary straight line are shorter.

6. The imaging device according to claim 1, wherein the imaginary straight line extends along a movement direction of the shutter member,
    the plurality of elastic members include a plurality of first elastic members that are disposed on the one side at intervals in the movement direction and a plurality of second elastic members that are disposed on the other side at intervals in the movement direction, and
    in a case where the elastic members are viewed in the direction of the optical axis, a distance between the imaginary straight line and the first elastic member in an orthogonal direction orthogonal to the movement direction is denoted by L1, a load caused to act on the support member in the movement direction by the first elastic member is denoted by F1, a distance between the imaginary straight line and the second elastic member in the orthogonal direction is denoted by L2, and a load caused to act on the support member in the movement direction by the second elastic member is denoted by F2, $F1 \times L1 = F2 \times L2$ is satisfied.

7. The imaging device according to claim 1,
wherein the imaginary straight line includes a first imaginary straight line extending in the movement direction and a second imaginary straight line extending in the orthogonal direction in a case where the imaginary straight line is viewed in the direction of the optical axis, the imaging device includes a plurality of auxiliary elastic members that include a third elastic member disposed on one side of the second imaginary straight line in the movement direction and a fourth elastic member disposed on the other side of the second imaginary straight line in the movement direction and are in contact with the device body and the support member, and in a case where a distance between the second imaginary straight line and the third elastic member in the movement direction is denoted by LA, a load caused to act on the support member in the orthogonal direction by the third elastic member is denoted by FA, a distance between the second imaginary straight line and the fourth elastic member in the movement direction is denoted by LB, and a load caused to act on the support member in the orthogonal direction by the fourth elastic member is denoted by FB, FA×LA=FB×LB is satisfied.

8. The imaging device according to claim 1,
wherein a plurality of damping members damping vibration of the shutter are sandwiched between the device body and the support member.

9. The imaging device according to claim 8,
wherein the support member is formed in a polygonal shape in a case where the support member is viewed in the direction of the optical axis.

10. The imaging device according to claim 9,
wherein the plurality of damping members are in contact with two side surfaces forming each corner of the support member in directions different from each other in a case where the plurality of damping members are viewed in the direction of the optical axis.

11. The imaging device according to claim 8,
wherein the plurality of damping members include friction members that damp vibration of the support member by friction forces.

12. The imaging device according to claim 1,
wherein the support member is housed in the device body.

13. The imaging device according to claim 1,
wherein the plurality of elastic members are in contact with a set of corners which are opposite corners of the support member in a case where the plurality of elastic members are viewed in the direction of the optical axis.

14. The imaging device according to claim 12,
wherein the plurality of elastic members are in contact with two side surfaces forming each of the corners in directions different from each other in a case where the plurality of elastic members are viewed in the direction of the optical axis.

15. The imaging device according to claim 12,
wherein an impact absorbing member, which absorbs impact acting on the shutter, is disposed in a rotation region of the corner about a center of gravity of the shutter and is sandwiched between the device body and the support member.

16. The imaging device according to claim 13,
wherein a sliding member is sandwiched between the device body and the support member in the direction of the optical axis.

17. The imaging device according to claim 13,
wherein a through-hole penetrating the support member in the direction of the optical axis is formed in the support member, a fastening target portion is formed on the device body, and the imaging device includes a fastening member including a shaft portion that is inserted into the through-hole and fastened to the fastening target portion and an overhanging portion that overhangs from an end portion of the shaft portion close to the support member in a direction crossing an axial direction.

18. The imaging device according to claim 17,
wherein a portion of an outer peripheral surface of the shaft portion facing a hole wall of the through-hole is provided with a contact member that has elasticity and is capable of coming into contact with the hole wall.

19. A vibration suppression method for an imaging device including an imager that includes an imaging surface orthogonal to an optical axis of light forming an optical image, a shutter that is provided in a device body, includes a support member and a shutter member supported by the support member and moving in a direction orthogonal to the optical axis, and adjusts an amount of light to be incident on the imager, and an actuator that moves the imager in the direction orthogonal to the optical axis to correct an amount of camera shake, the vibration suppression method comprising:

disposing elastic members on at least one side and the other side of an imaginary straight line passing through a center of gravity of the shutter and orthogonal to the optical axis in a case where the elastic members are viewed in a direction of the optical axis;

causing, by the plurality of elastic members, loads to act on the support member; and supporting the support member by the device body through the elastic members to suppress vibration of the shutter.

* * * * *